(12) United States Patent
Cohn et al.

(10) Patent No.: US 11,610,228 B2
(45) Date of Patent: Mar. 21, 2023

(54) SYSTEM AND METHOD FOR NOTIFYING CONTACTS OF PROXIMITY TO RETAILER

(71) Applicant: NeedAnything, LLC, Birmingham, MI (US)

(72) Inventors: Sheldon Cohn, West Bloomfield, MI (US); Jeff Sloan, Birmingham, MI (US); Reaz Hoque, Stamford, CT (US)

(73) Assignee: NeedAnything, LLC, Birmingham, MI (US)

( * ) Notice: Subject to any disclaimer, the term of this patent is extended or adjusted under 35 U.S.C. 154(b) by 0 days.

(21) Appl. No.: 17/612,149

(22) PCT Filed: May 18, 2020

(86) PCT No.: PCT/US2020/033395
§ 371 (c)(1),
(2) Date: Nov. 17, 2021

(87) PCT Pub. No.: WO2020/236709
PCT Pub. Date: Nov. 26, 2020

(65) Prior Publication Data
US 2022/0148038 A1    May 12, 2022

Related U.S. Application Data

(60) Provisional application No. 62/849,555, filed on May 17, 2019.

(51) Int. Cl.
*G06Q 30/02* (2012.01)
*G06Q 30/0251* (2023.01)
(Continued)

(52) U.S. Cl.
CPC ..... *G06Q 30/0261* (2013.01); *G06Q 30/0633* (2013.01); *H04W 4/12* (2013.01); *H04W 4/21* (2018.02)

(58) Field of Classification Search
CPC . G06Q 30/0261; G06Q 30/0633; H04W 4/21; H04W 4/12
See application file for complete search history.

(56) References Cited

U.S. PATENT DOCUMENTS 8,874,129 B2    10/2014    Forutanpour et al.
9,037,485 B2     5/2015    Fu et al.
(Continued)

OTHER PUBLICATIONS

International Search Report & Written Opinion for application No. PCT/US2020/033395 dated Aug. 26, 2020.
(Continued)

*Primary Examiner* — Scott C Anderson
(74) *Attorney, Agent, or Firm* — The Dobrusin Law Firm, P.C.

(57) ABSTRACT

The present teachings a method including: receiving a beacon signal, from a beacon signal provider when a user mobile device is within a range of the beacon signal provider; generating a first notification to transmit from the user mobile device to one or more contact mobile devices based on an associated protocol; transmitting the first notification to the one or more contact mobile devices; and receiving a shopping request from the one or more contact mobile devices; wherein communication between the user and the one or more contacts is automatically facilitated so that the user is relieved of establishing and maintaining communication with one or more contacts; and wherein communication with the one or more contacts by the first notification is undertaken substantially instantaneously upon receiving the beacon signal.

16 Claims, 10 Drawing Sheets

(51) Int. Cl.
*H04W 4/21* (2018.01)
*G06Q 30/0601* (2023.01)
*H04W 4/12* (2009.01)

(56) References Cited

U.S. PATENT DOCUMENTS

| | | | |
|---|---|---|---|
| 10,248,978 B2* | 4/2019 | Eramian | G06Q 30/0633 |
| 2013/0073335 A1* | 3/2013 | Tang | G06Q 30/02 |
| | | | 705/7.29 |
| 2013/0346245 A1 | 12/2013 | Desore | |
| 2014/0365354 A1* | 12/2014 | Shvarts | G06Q 40/02 |
| | | | 705/38 |
| 2015/0039468 A1* | 2/2015 | Spitz | G06Q 30/0613 |
| | | | 705/26.41 |
| 2015/0142591 A1* | 5/2015 | High | G06Q 30/0613 |
| | | | 705/26.41 |
| 2015/0227890 A1 | 8/2015 | Bednarek et al. | |
| 2018/0012179 A1 | 1/2018 | Wilkinson et al. | |
| 2018/0046982 A1 | 2/2018 | Li et al. | |
| 2018/0101881 A1* | 4/2018 | Tian | G06Q 40/00 |
| 2018/0332448 A1 | 11/2018 | Nordstrom et al. | |
| 2019/0236632 A1* | 8/2019 | Muller | G07C 15/006 |
| 2019/0302221 A1* | 10/2019 | Sheng | G01S 5/0252 |

OTHER PUBLICATIONS

International Preliminary Report on Patentability, application No. PCT/US2020/033395 dated May 28, 2021.

* cited by examiner

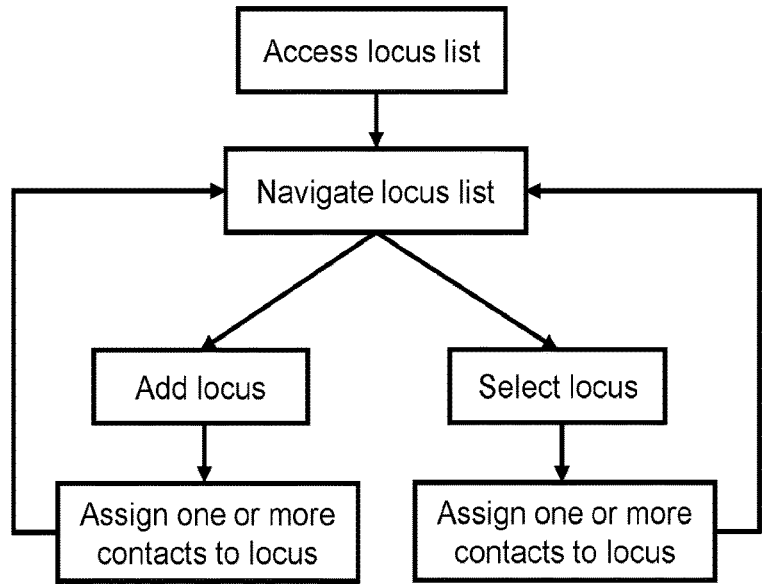
FIG. 7
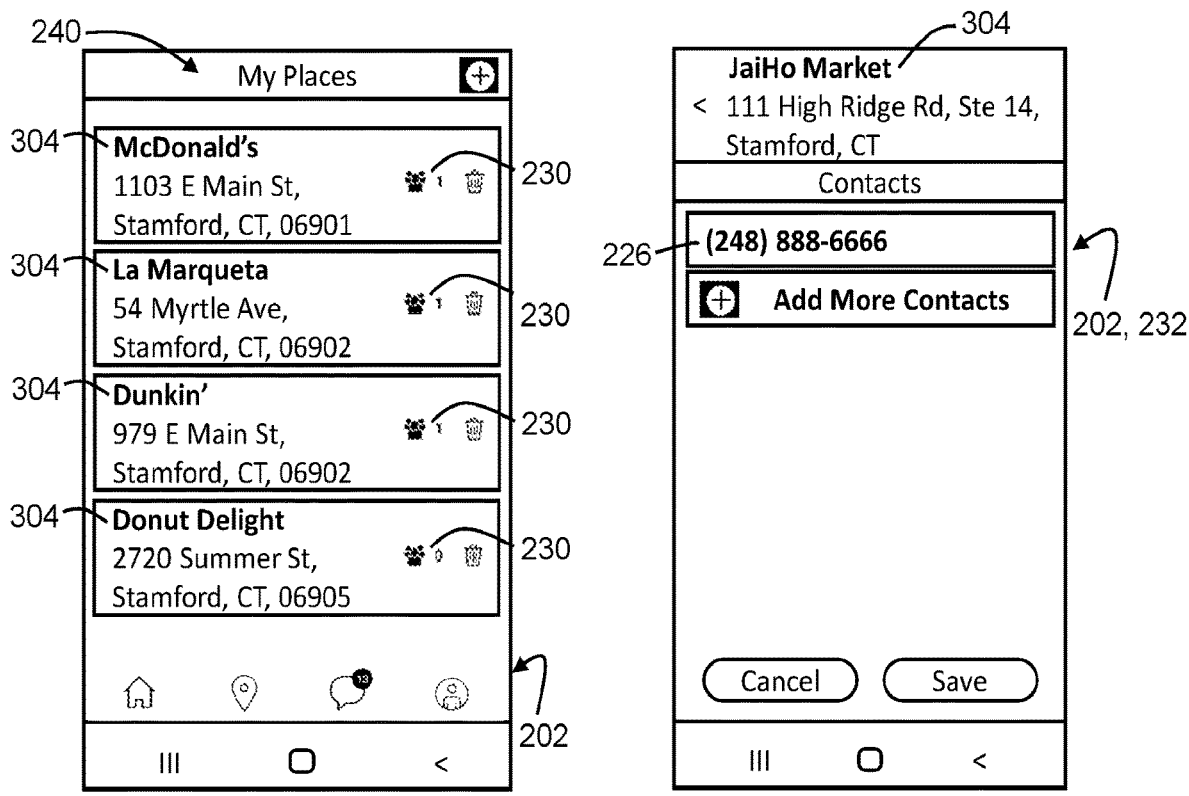
FIG. 8A
FIG. 8B

SYSTEM AND METHOD FOR NOTIFYING CONTACTS OF PROXIMITY TO RETAILER

FIELD

The present teachings generally relate to a system and method for notifying contacts of a user's proximity to a particular locus. The system and method may be particularly advantageous in notifying contacts of a user's proximity to retailers in order to prompt the contacts to make purchasing requests of the user.

BACKGROUND

Shopping to maintain a household is commonly more complicated than merely generating a shopping list and completing that shopping list in a single trip. In addition to the need for visiting a plurality of retailers (e.g., grocery, hardware, pharmacy, electronics, and the like) the needs for members of a familial or social network may be immediate, unknown to the shopper when a retailer is visited, and even evolving as the day or week progresses. For example, a shopper may pass by or visit a retailer location, on their way home from work, unbeknownst to a member of the household who the shopper provides for, while there is an immediate need by that member of the household for a product that retailer provides. As a result, more shopping trips are needed to satisfy the needs of all members of a familial or social network. This problem is particularly pronounced when the shopper leads a busy lifestyle, the shopper needs to provide for a number of different people, needs for products or services are numerous, the shopper's home or work is remote from retailers of interest, or perhaps the shopper is providing for different familial and/or social networks.

Some location-based notifications are sent only to the individual entering and/or remaining in a location. Notifications can act to remind an individual that an action is desired at a particular location such as purchasing an item or contacting someone. For example, Google Keep and Apple iPhone Reminders allow for an individual to set location-based notifications that activate to remind the individual who set the reminder to carry out a task. However, reminders sent to an individual who enters a location do not obviate the extra steps (e.g., unlocking a mobile phone, selecting an application, scrolling through a contact list, and typing out an SMS message) of interacting with a mobile device and formulating a message to one or perhaps many people. The time and focus necessary to formulate messages and perhaps carry on a conversation, whether by voice call or SMS, detracts from the efficiency of the individual completing the tasks sought out at the location.

Other location-based notification systems are concerned with advertising one's personal life or monitoring another person's activity. In other words, these systems operate for the sake of passive monitoring rather than active bilateral communication between a person on-location and one or more persons in a personalized network. For example, U.S. Pat. No. 9,037,485 B2 teaches sending notifications to groups of users if an individual stays at a particular location for a requisite period of time. However, broadcasting location information, triggered by a stay at any number of location types, to a broad audience does not provide management tools for task-specific actions (e.g., obtaining the shopping needs for a household). Notifications generated in response to a stay at any type of location can lead to fatigue for those monitoring the locations of others. The lack of tools to streamline notifications and communication for task-specific actions, such as setting particular locations for which a notification is desired, leads to oversaturation of information.

Other location-based notification systems rely on manual user input on individual bases for designating a location. For example, U.S. Pat. No. 8,874,129 B2 teaches manually drawing a boundary line in a digital format (e.g., digital map) or manually inputting coordinates to establish a geo-fence. However, the need for individualized manual input reduces the convenience of the notification system, particularly if the notification is desired to be activated on a routine basis and by a plurality of individuals. Some points of interest are substitutable for other points of interest (e.g., two different grocery store chains such as Kroger® and Meijer®) and some points of interest operate business in several locations within a certain geographical scope (e.g., a town). Regular commutes to work or to see family and friends can direct individuals through many different routes and through many different geographic areas. Individualized manual input does not address the complexity of these factors to streamline communication channels.

There is a need for a notification system whereby members of a familial or social network are informed when a shopper passes by or enters a retailer. There is a need for a streamlined communication system that directs shoppers to a single interface to view the needs of one or more of their contacts. There is a need for contacts of a shopper to accurately request products or services. There is a need for a notification system that automatically notifies the contacts of a shopper's proximity to a particular retailer without a shopper having to initiate a message or call or remember to message or call contacts that may be interested.

SUMMARY

The present disclosure relates to one or more computer storage media storing computer-executable instructions that, when executed by a computing device having a processor, cause the computing device to perform a method that provides concise and facilitated communication between a user and one or more contacts, the method comprising: a) receiving a beacon signal, from a beacon signal provider when a user mobile device is within a range of the beacon signal provider; b) generating a first notification to transmit from the user mobile device to one or more contact mobile devices based on an associated protocol; c) transmitting the first notification to the one or more contact mobile devices; and d) receiving a shopping request from the one or more contact mobile devices; wherein communication between the user and the one or more contacts is automatically facilitated so that the user is relieved of establishing and maintaining communication with one or more contacts; and wherein communication with the one or more contacts by the first notification is undertaken substantially instantaneously upon receiving the beacon signal.

The present disclosure relates to one or more computer storage media storing computer-executable instructions that, when executed by a computing device having a processor, cause the computing device to perform a method that provides concise and facilitated communication between a user and one or more contacts, the method comprising: receiving a beacon signal, from a beacon when a user mobile device is within a range of the beacon, generating a first notification to transmit from the user mobile device to one or more contact mobile devices based on an associated protocol; transmitting the first notification to the one or more contact mobile devices; and receiving a shopping request (e.g., shopping list) from the one or more contact mobile devices; wherein communication between the user and the one or more contacts is automatically facilitated so that the user is relieved of establishing and maintaining communication with one or more contacts while engaged with sensory inputs and motor functions associated with driving, shopping, or both wherein communication with the one or more contacts by the first notification is undertaken substantially instantaneously; and wherein the communication with the user by the shopping request reduces a chance that goods and/or services are overlooked by the user when assembling the goods and/or services.

The present disclosure relates to a system for providing a first notification to one or more contacts of a user, comprising: a user mobile device, including one or more user processors and one or more user computer storage media, one or more contact mobile devices, each of which including one or more contact processors and one or more contact computer storage media, one or more beacons, one or more retailer devices, one or more retailer databases, and one or more networks; wherein the one or more user computer storage media includes a contact list.

BRIEF DESCRIPTION OF THE DRAWINGS

FIG. 7 illustrates a flowchart of a method of the present disclosure.

FIG. 8A illustrates a view of a user GUI.

FIG. 8B illustrates a view of a user GUI.

DETAILED DESCRIPTION

Figure 1:
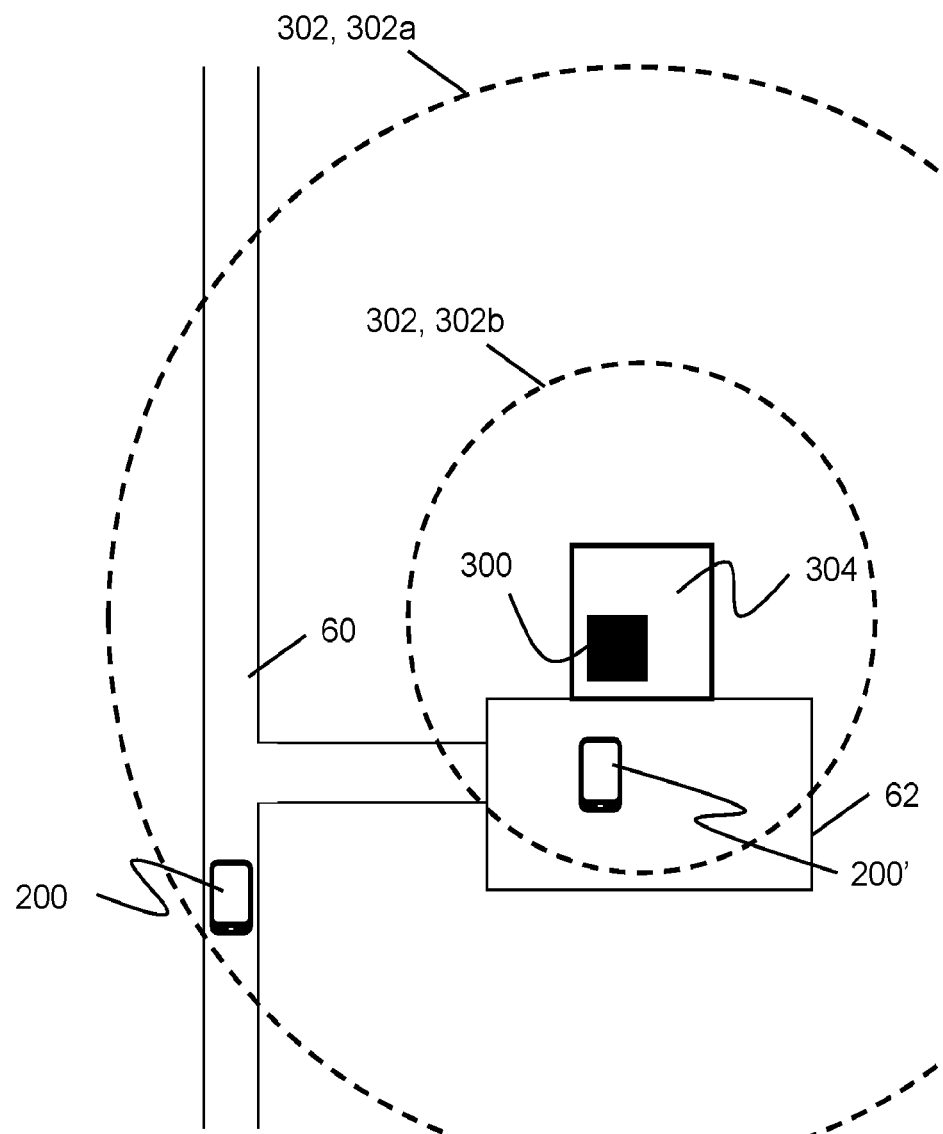
FIG. 1 illustrates an overhead view of a user mobile device in relation to a locus.

The present teachings meet one or more of the above needs by the improved system and method described herein. The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The system and method of the present disclosure may be used by one or more users (i.e., shoppers), one or more contacts, one or more retailers, one or more third-parties, or any combination thereof. The contacts may be members of a familial and/or social network with respect to the one or more users including but not limited to family living within the same household, immediate family, extended family, neighbors, roommates, co-workers, friends, acquaintances, or any combination thereof. The system and method of the present disclosure may be used by the user and one or more contacts of the user to enhance communication, shopping efficiency, time efficiency, monetary efficiency, or any combination thereof, as it relates to the provision of goods and/or services for the user and contacts using the application and linked via the application discussed herein. Particularly, the system and method of the present disclosure provide for a unique and unconventional means of communication that improves, between shoppers and contacts, the speed of communication, the amount of information that can be conveyed in a given period of time, the number of persons between which information is exchanged, or any combination thereof. For example, the system and method may instantly inform contacts of a proximity and/or presence of a user at a loci (e.g., retailer) and provide one or more contacts a means to communicate shopping requests (e.g., shopping lists) to the user while obviating the need for the user to formulate one or more text messages or conduct one or more calls. Furthermore, the system and method of the present disclosure may provide retailers with a means for obtaining useful data regarding shopping habits and/or inventory as well as communicate with the user and/or the contacts such as informing of the presence or absence of products in inventory or conveying deals (e.g., sales promotions or coupons) for products.

The present disclosure provides for a unique and unconventional system and method for a user to rapidly communicating the location of the user to contacts and contacts rapidly communicating shopping preferences. More particularly, the unique and unconventional system and method provides a communication channel between a user, who is located in a proximity to a retailer, and one or more contacts in a network of the user, the contacts having a variety of shopping needs. The system and method obviates the time consuming task of contacting individual contacts, either by phone or by text, and coordinating a shopping request (e.g., shopping list). Contacts may be automatically notified of a user's proximity to a retailer and contacts may be prompted to send requests to the user, which can be retrieved from the retailer. The notification to contacts may be sent substantially instantaneously upon the user breaching a proximity of a retailer and any number of contacts may be notified simultaneously, which result is not conventionally obtainable by individually communicating with (e.g., texting) one or possibly many persons in the user's personal network. The contacts notified when the user is in proximity to a retailer may be pre-designated so the user does not forget, in the moment, about those persons in their network who should be reminded that the user may be about to enter a retailer. The requests for items by the contacts may be allocated in a single application and/or GUI in order to reduce the amount of physical manipulation of computing devices (e.g., mobile phones) allowing for the user to save time and maintain focus while shopping.

The present disclosure provides for a unique and unconventional system and method of locating points of interest, specifically retailers, to users. The present disclosure provides for beacons, one or more of which may be located in a retailer and transmit a signal to computing devices (e.g., mobile phones) within a certain range of the beacon. The range of the beacons may obviate the wide, perhaps overlapping ranges of geo-fencing, which in some instances is conventionally designated by latitude and longitude coordinates. The range of the beacons and the customization thereof may be particularly advantageous in busy city-centers, shopping malls, and the like. The signal technology (e.g., Bluetooth) utilized by the beacons also obviates the inaccuracies of other location designations such as latitude and longitude coordinates.

System

The present teachings may relate to a system for automatically facilitating communication between a user and one or more contacts upon being in proximity of or within a retail establishment. The system may facilitate communication between one or more computing devices over one or more networks; one or more computing devices and one or more beacons; or both. The system may allow for one or more computing devices (e.g., a user's mobile device) to receive a beacon signal when the computing devices are within a range of a beacon transmitting the beacon signal. The system may allow for one or more computing devices to receive input from a user, one or more contacts, or both. The system may allow for one or more contacts to communicate with a user, a user to communicate with one or more contacts, or both, via the application. Communication between a user and one or more contacts may be automated, manual, or both. The system may generate one or more notifications. The system may send one or more notifications to one or more contacts from the user. The system may include one or more computing devices, one or more processors, one or more storage media, one or more databases, one or more communication modules, one or more networks, one or more communication hubs, one or more beacons, one or more applications, the like, or any combination thereof.

The system may include one or more computing devices. The computing device may function to receive and/or transmit one or more signals, communicate with one or more beacons, convert one or more signals to data entries, to send one or more data entries to a storage medium, to store one or more data entries, to retrieve one or more data entries from a storage medium, to execute one or more computer-executable instructions, to compute one or more algorithms, apply one or more rules (i.e., "protocol"), or any combination thereof. The computing device may include or be in communication with one or more other computing devices, processors, storage media, databases, user interfaces, touch-sensitive monitor screens, or any combination thereof. The computing device may communicate with one or more other computing devices, processors, storage media, databases, or any combination thereof through an interaction interface (e.g., an application programming interface ("API")). The computing device may be one or more personal computers (e.g., laptop or desktop), mobile devices (e.g., tablet, mobile phone, smart watch, etc.), or any combination thereof. The personal computer may be a laptop computer or a desktop computer. The mobile device may be a tablet, mobile phone, or smart watch. The computing device may be a user computing device, a contact computing device, a retailer computing device, or a third-party computing device.

The one or more computing devices may include one or more user interfaces. The one or more user interfaces may function to display information related to the application, receive user inputs related to the application, transmit information related to the application, or any combination thereof. One or more user interfaces may be located on a main computing device (i.e., the computing device having a storage medium where the application is stored), a separate computing device (e.g., a display separate from the computing device having a storage medium where the application is stored), or both. One or more user interfaces may be part of one or more computing devices. One or more user interfaces may include one or more interfaces capable of relaying information (e.g., data entries) to a user, receiving information (e.g., data signals) from a user, or both. One or more user interfaces may display information related to the application. One or more user interfaces may display information from one or more algorithms, applications, or both. One or more user interfaces may allow for inputting of information related to the application. Information may include a user name, password, one or more instruction signals, the like, or any combination thereof. The one or more user interfaces may include one or more graphic user interfaces ("GUI"). The one or more graphic interfaces may include one or more screens. The one or more screens may be a screen located directly on the main computing device, another computing device, or both. The one or more screens may be a screen on a mobile computing device, non-mobile computing device, or both. The one or more graphic user interfaces may include and/or be in communication with one or more user input devices. The one or more user input devices may allow for receiving one or more inputs (i.e., "instruction signals") from a user. The one or more input devices may include one or more buttons, wheels, keyboards, switches, mice, joysticks, touch pads (i.e., a touch-sensitive area, provided as a separate peripheral or integrated into a computing device, that does not display visual output (e.g., the Intuos line of tablets available from Wacom®)), touch-sensitive monitor screens, microphones, the like, or any combination thereof. The one or more input devices may be integrated with a graphic user interface. The audio interface (i.e., microphones) may function to project sound to a user and/or receive sound from a user. The audio interface may include audio circuitry, one or more speakers (i.e., "audio peripheral", devices that convert electrical signal to human-audible sound waves), one or more microphones (i.e., "audio peripheral", devices that convert human-audible sound waves to electrical signals). The audio circuitry may transmit electrical signal from one or more computers to one or more audio peripherals. The one or more touch-sensitive monitor screens may function to accept input from a user based on haptic and/or tactile contact. The touch-sensitive monitor screen may include a screen, a display controller, or both. The touch-sensitive monitor screen may detect contact on the screen and convert the detected contact into interaction with interface objects (e.g., buttons, icons, web pages, images, the like, or any combination thereof) that are displayed on the touch-sensitive monitor screen. The touch-sensitive monitor screen may utilize LCD (liquid crystal display) technology, LPD (light emitting polymer display) technology, LED (light emitting diode) technology, or OLED (organic light emitting diode) technology. The touch-sensitive monitor screens may detect contact via any suitable touch sensing technology such as capacitive (e.g., projected capacitive technology), resistive, infrared, and surface acoustic wave technologies. An example of touch technology may include but is not limited to that used in the iPhone®, iPod Touch®, and iPad® from Apple Inc. of Cupertino, Calif. The touch-sensitive monitor screen may detect contact from an appendage (e.g., finger), an object (e.g., a stylus), or both. The signal generated from touch finger-based input may be converted into a precise pointer/cursor position or command for performing the actions desired by the user.

The user interface may include one or more interface metaphors (i.e., "interface objects"). The interface metaphor may function to give the user instantaneous knowledge about how to interact with the user interface. The interface metaphor may include visuals, actions, and procedures that exploit specific knowledge that users may already possess from other domains of life. An example of an interface metaphor may be a file folder icon. A user generally intuitively knows a file folder icon contains one or more individual files. Another example of an interface metaphor may be one or more tabs in a window of a data processing program (e.g., Microsoft Excel), which a user intuitively knows to correspond with different pages. Another example of an interface metaphor may be a button displayed on a touch-sensitive monitor screen. A user generally intuitively knows that upon pressing a button, an associated function may be initiated.

A user interface may display one or more menus. The one or more menus may function to arrange related interface metaphors on a single user interface and guide the user and/or contacts in navigating the application. The one or more menus may include one or more saved loci menus, customization menus, contact information menus, main menus, alert screens, the like, or any combination thereof. The data associated with each menu may be derived from the one or more databases and/or information inputted by the user, the one or more contacts, or both. The alert screen may prompt the user to send a notification to the contact that the user is in proximity to a retailer. The alert screen may display one or more icons that give the user the option whether or not to notify one or more contacts. The main menu may prompt a contact to send a notification to the user. The main menu may display an icon that prompts one or more contacts to notify the user that the contact needs anything. The saved loci menu may display one or more loci. The saved loci menu may include icons that indicate whether there are contacts assigned to the locus. The icon may indicate how many contacts are assigned to the locus. The contact assignment with the loci may be provided by data from one or more databases and/or a contact list stored on the user's computing device. The customization menu may display one or more loci and one or more contacts. The user may add contacts associated with a particular loci. The contacts may be provided by data from the contact list stored on the user's computing device. The contact information menu may display data associated with one or more contact accounts. The contact information may include names, phone numbers, date of birth, the like, or any combination thereof. The user may manually input information regarding contacts via the contact information menu.

The computing device may include one or more global positioning system ("GPS") modules. The GPS module may function to send and/or receive location information from a GPS satellite. The location information may be defined by latitude, longitude, altitude, or any combination thereof. Relating the latitude, longitude, altitude or any combination thereof, of one locus to another locus may denote movement information (e.g., distance, speed, or both). For example, a user processor may obtain information from the user GPS module and compare that information to stored mapping data relating to other loci; as a result, the processor may produce outputs such as the distance from a locus and the time it may take for the user to travel to that locus.

The system may include one or more processors. The processor may function to analyze one or more signals from one or more applications, storage media, databases, communication modules, or any combination thereof. The processor may be located within and/or in communication with one or more computing devices, servers, storage media, or any combination thereof. One or more processors may be in communication with one or more other processors. The one or more processors may function to execute part or all of one or more applications, process data, execute one or more algorithms to analyze data, apply one or more rules (i.e., "protocol"), evaluate data against one or more rules, or any combination thereof. Processing data may include receiving, transforming, outputting, executing, the like, or any combination thereof. One or more processors may be part of one or more hardware, software, systems, or any combination thereof. One or more hardware processors may include one or more central processing units ("CPU"), multi-core processors, front-end processors, the like, or any combination thereof. One or more software processors may include one or more word processors, one or more document processors, the like, or any combination thereof. One or more system processors may include one or more information processors, the like, or any combination thereof. Examples of suitable processors may include the Apple A13 Bionic or the ARM® Cortex®-M4 32-bit processor with FPU, incorporated herein by reference in its entirety for all purposes. The one or more processors may be located within a same or different non-transient storage medium as one or more storage media, other processors, communication modules, communication hubs, or any combination thereof. The one or more processors may include one or more cloud-based processors. A cloud-based processor may be part of or in communication with a dispatch interface, an interaction interface, or both. A cloud-based processor may be located remote from a computing device, one or more other processors, one or more databases, or any combination thereof. Cloud-based may mean that the one or more processors may reside in a non-transient storage medium located remote from a computing device, other processor, one or more databases, or any combination thereof. One or more cloud-based processors may be accessible via one or more networks. A suitable cloud-based processor may be Amazon Elastic Compute Cloud™ (EC2™) may be provided by Amazon Web Services®, incorporated herein by reference in its entirety for all purposes. Another suitable platform for a cloud-based processor may include Lambda™ provided by Amazon Web Services®, incorporated herein by reference in its entirety for all purposes. The one or more processors may convert data signals to data entries to be saved within one or more storage media. The one or more processors may access one or more algorithms to analyze one or more data entries and/or data signals. The one or more processors may access one or more algorithms saved within one or more storage media.

The system may include one or more storage media (i.e., "computer storage media"). The one or more storage media may function to store one or more applications, data, databases, algorithms, rules, computer-executable instructions, the like, or any combination thereof. The one or more storage media may function to cooperate with one or more processors for accessing, executing, and/or storing one or more applications, data, databases, algorithms, rules, computer-executable instructions, the like, or any combination thereof. The one or more storage media may be solid state disk ("SSD") or hard drive disk ("HDD"). The one or more storage media may include one or more hard drives (e.g., hard drive memory), chips (e.g., Random Access Memory "RAM"), discs, flash drives, memory cards, the like, or any combination thereof. One or more discs may include one or more floppy diskettes, hard disk drives, optical data storage media including CD ROMs, DVDs, and the like. One or more chips may include ROMs, flash RAM, EPROMs, hardwired or preprogrammed chips, nanotechnology memory, or the like. The one or more storage media may include one or more cloud-based storage media. A cloud-based storage medium may be located remote from one or more computing devices, one or more processors, one or more databases, or any combination thereof. Cloud-based may mean that the one or more storage media may reside in a non-transient storage medium located remote from the one or more computing devices, processors, other databases, or any combination thereof. One or more cloud-based storage media may be accessible via one or more networks. A suitable cloud-based storage medium may be Amazon S3™ provided by Amazon Web Services®, incorporated herein by reference in its entirety for all purposes. The data stored within one or more storage devices may be compressed, encrypted, or both. One or more storage media may store one or more data entries in a native format, foreign format, or both. One or more storage media may store data entries as objects, files, blocks, or any combination thereof. The one or more storage devices may be located within, part of, or in communication with one or more computing devices, beacons, processors, user interfaces, the like, or any combination thereof. The one or more storage media may include one or more applications, algorithms, rules, databases, data entries, the like, or any combination thereof stored therein. The one or more storage media may store data in the form of one or more databases.

The system may include one or more databases. The one or more databases may function to receive one or more data entries, store one or more data entries, allow for retrieval of one or more data entries, or any combination thereof. The one or more databases may be located within one or more storage media. The one or more databases may include any type of database able to store digital information. The digital information may be stored within one or more databases in any suitable form using any suitable database management system ("DBMS"). Exemplary storage forms may include but are not limited to relational databases, non-relational databases, correlation databases, ordered/unordered flat files, structured files, the like, or any combination thereof. The relational databases may include SQL database, row-oriented, column-oriented, or any combination thereof. The non-relational databases may include NoSQL database. One or more databases may store one or more classifications of data models. The one or more classifications may include column (e.g., wide column), document, key-value (e.g., key-value cache, key-value store), object, graph, multi-model, or any combination thereof. One or more databases may be located within or be part of hardware, software, or both. One or more databases may be stored on a same or different hardware and/or software as one or more other databases. One or more databases may be located within one or more non-transient storage media. One or more databases may be located in a same or different non-transient storage medium. One or more databases may be accessible by one or more processors to retrieve data entries for analysis via one or more algorithms. The one or more databases may be one or more cloud-based databases. Cloud-based may mean that the one or more databases may reside in a non-transient storage medium located remote from the one or more computing devices. One or more cloud-based databases may be accessible via one or more networks. One or more databases may include one or more databases capable of storing contacts, GPS locations, notification data (e.g., history of sent notifications), retailer inventory, messaging data (e.g., message content), user accounts (e.g., name, phone number, date of birth, and the like), user settings, contact accounts (e.g., name, phone number, date of birth, and the like), contact settings, user and/or contact shopping history, retailer accounts, retailer settings, retailer history, beacon data, the like, or any combination thereof. The one or more databases may include one or more locus tables, contact tables, the like, or a combination thereof. One or more locus tables may store one or more loci identities, beacon signals corresponding to each locus, the like, or any combination thereof. One or more contact tables may store one or more contacts, contact accounts, beacon signals associated with one or more contacts, the like, or any combination thereof. One suitable database service may be Amazon DynamoDB® offered through Amazon Web Services®, incorporated herein by reference in its entirety for all purposes.

The system of the present disclosure may include one or more communication modules. One or more communication modules may allow for the one or more computing devices to receive and/or transmit one or more signals from one or more computing devices, be integrated into a network, or both. The one or more communication modules may have any configuration which may allow for one or more data signals from one or more controllers to be relayed to and/or from one or more other controllers, communication modules, communication hubs, networks, computing devices, processors, the like, or any combination thereof located external of the computing devices. The one or more communication modules may include one or more wired communication modules, one or more wireless communication modules, or both. A wired communication module may be any module capable of transmitting and/or receiving one or more data signals via a wired connection. One or more wired communication modules may communicate via one or more networks via a direct, wired connection. A wired connection may include a local area network ("LAN") wired connection by an ethernet port. A wired communication module may include a PC Card, PCMCIA card, PCI card, the like, or any combination thereof. A wireless communication module may include any module capable of transmitting and/or receiving one or more data signals via a wireless connection. One or more wireless communication modules may communicate via one or more networks via a wireless connection. One or more wireless communication modules may include a Wi-Fi transmitter, a Bluetooth® transmitter, an infrared transmitter, a radio frequency transmitter, an IEEE 802.15.4 compliant transmitter, a GNSS module, and NFC module, the like, or any combination thereof. A Wi-Fi transmitter may be any transmitter complaint with IEEE 802.11. A wireless communication module may be single band, multi-band (e.g., dual band), or both. A wireless communication module may operate at 2.4 Ghz, 5 Ghz, the like, or any combination thereof. A communication module may communicate with one or more other communication modules, one or more computing devices, one or more processors, or any combination thereof directly; via one or more communication hubs, one or more networks, or both.

The system of the present disclosure may be integrated into one or more networks. The computing devices may be in selective communication with one or more networks. The one or more networks may be formed by placing two or more computing devices in communication with one another. One or more networks may include one or more communication hubs, communication modules, computing devices, or any combination thereof. One or more networks may be free of one or more communication hubs. One or more computing devices of the system may be directly connected to one another without the use of a communication hub. One or more networks may be connected to one or more other networks. One or more networks may include one or more local area networks ("LAN"), wide area networks ("WAN"), virtual private network ("VPN"), intranet, Internet, the like, or any combination thereof. The one or more networks may be a cellular network, which may comprise a distributed network of cells, each including a transceiver. The one or more networks may be a wireless network. The wireless network may be a WiFi network. The network may be temporarily, semi-permanently, or permanently connected to one or more computing devices, or any combination thereof. A network may allow for one or more computing devices to be connected to the computing device to transmit one or more data signals to the one or more computing devices, receive one or more data signals from the one or more computing devices, or both. The network may allow for one or more signals from one or more controllers to be relayed through the system to one or more other controllers, computing devices, processors, storage media, the like, or any combination thereof. The network may allow for one or more computing devices to receive one or more data entries from and/or transmit one or more data entries to one or more storage media. The network may allow for transmission of one or more signals, status signals, data entries, instruction signals, or any combination thereof, for processing by one or more processors.

The system of the present disclosure may include one or more communication hubs. The one or more communication hubs may function to receive one or more signals, transfer one or more signals, or both from one or more computing devices. One or more communication hubs may be any type of communication hub capable of sending and/or transmitting data signals over a network to one or more computing devices. One or more communication hubs may include a wired router, a wireless router, an antenna, the like, or any combination thereof. One or more communication hubs may be connected to the one or more computing devices via a wired connection, a wireless connection, or both. One or more communication hubs may allow for communication of a computing device with another computing device when the computing device is directly connected to the communication hub, indirectly connected to the communication hub, or both. A direct connection to the communication hub may mean that the computing device is directly connected to the communication hub via a wired and/or wireless connection and communicates with the communication hub.

The system may include one or more beacon signal providers. The beacon signal provider may function to transmit one or more beacon signals to one or more computing devices. The beacon signal providers may include one or more beacons, geo-fences, the like, or any combination thereof.

The one or more beacon signal providers may transmit one or more beacon signals. The one or more beacon signals may function to convey a location of a locus and/or additional information about the locus. The beacon signal may include a beacon signature, a mailing address, a latitude and longitude, or any combination thereof.

The system may include one or more beacons. One or more beacons may function to transmit signals that may be received by one or more computing devices, sense the presence of one or more computing devices within a range, communicate with one or more computing devices, or any combination thereof. One or more beacons may transmit a signal. The signal may be a radio signal, Bluetooth® signal, cellular signal, internet signal, the like, or a combination thereof. The signal may have a range that may be limited by the identity of the signal. The signal may be selectively turned on or off. For example, a signal may be turned on during business hours and turned off during non-business hours. The beacon range may be set to avoid overlap with other retailers, other beacon ranges, or both in the immediate area. The beacon may have a range of about 10 meters or greater, about 15 meters or greater, about 25 meters or greater, about 50 meters or greater, about 100 meters or greater, or even about 200 meters or greater. The beacon may have a range of about 10,000 meters or less, about 5,000 meters or less or less, or even about 2,500 meters or less. For example, Bluetooth® signals may have a maximum range of about 100 meters or even about 200 meters. As another example, radio signals may have a maximum range of about 6 miles (about 9,656 meters, such as for ultra-high frequency radio signals). The beacon may have an adjustable range. The range may be adjustable such that the beacon and range can be customized based on a beacon's location. A beacon in a more remote loci may have a larger range. For example, a beacon in a grocery store with a large adjacent parking lot in a rural setting may have a range which extends out to a nearby road entering the parking lot. A beacon for a locus in a more populated, dense area may have a smaller range. For example, a beacon at a retail store within an urban center may only extend out to a pedestrian path near an entrance of the retail store. The beacon may be capable of micro-location. Micro-location may mean determining a distance between the beacon and a computing device with a resolution as low as an inch or more. The beacon may operate under the Bluetooth® 4.2 LE standard or Bluetooth® 5 LE standard. The beacon may include one or more processors, storage media, antennae, or any combination thereof. One or more antennae may include one or more PCB inverted-F antennas, monopole PCB antennas, meander PCB antennas, the like, or any combination thereof. One or more beacons may be powered by a power source. The power source may be a continuous power source, a charged power source, the like or a combination thereof. A continuous power source may be an external power supply. An external power supply may be alternating or direct current. A charged power source may be a battery. A battery may be a replaceable battery, a rechargeable battery, or both. The beacon may be selectively turned on or off. For example, to conserve battery power, the beacon may be turned off outside of business hours. Some suitable beacons may include the Proximity Beacon and Location Beacon, commercially available from Estimote, Inc., incorporated by reference herein. The network signal may transmit a GPS location of the beacon via a network to one or more computing devices. The signal may be one or more of the aforementioned signals. For example, a beacon may be located in a grocery store and the GPS location of the beacon may be transmitted to a user mobile device, via a network, when the user is several miles away from the locus and the Bluetooth® signal may be transmitted to a user mobile device when the user is approaching the front entrance of a grocery store. One or more beacons may be located on the premises of a business. One or more beacons may be located in two or more locations on the premises of a retailer. For example, beacons may be located in two or more departments of a department store. The beacons may be controllable manually or through an application (i.e., administrator rights).

The one or more beacons may be associated with and/or transmit a beacon signature. A beacon signature may function to identify one or more loci, users, contacts, or any combination thereof. A beacon signature may be in the form of numbers, letters, symbols, or any combination thereof. A beacon signature may be associated with identifying information. Identifying information may include a name of a locus, a category of goods and/or services provided by the locus, a location of the locus (e.g., mailing address; latitude and longitude), a status of a locus (e.g., open or closed), or any combination thereof. Loci that have an open status (i.e., open for business) may be published, searchable, or both (i.e., recognized) on the application of the present disclosure. Loci that have a closed status (i.e., closed for business) may not be published, searchable, or both by the application of the present disclosure. For example, an individual may host a garage sale and control the time during which the beacon may be recognized (e.g., between 12 PM and 4 PM on a Saturday). As another example, a food truck may run out of food and instantly set the beacon signature to convey a closed status. As another example, a brick-and-mortar retailer may control business hours on a daily basis (e.g., abnormal break hours), on a long-term basis (e.g., regular business hours during a given year), or on a basis of special events (e.g., holiday business hours). The location of the locus may be controllable. For example, a food truck that frequently travels to different locations may set and subsequently re-set a location of a beacon located on the food truck. A beacon signature may be transmitted by one or more beacons. A beacon signature may be received by one or more computing devices. The beacon signature may be unique to the particular locus of a retailer, a business entity, a parent company, or any combination thereof. For example, the beacon signature may denote that the locus is a grocery establishment operated by a particular business entity and may also denote the address or perhaps store ID of that particular location. The beacon signature may be unique to one or more particular loci within a retailer. For example, each of several beacons may be located in different aisles of a grocery store and the respective beacon signature may identify each aisle.

A beacon may be temporarily used on an ad hoc basis. Ad hoc beacons may be temporarily registered to (i.e., a beacon signature personalized to) an individual or business and then re-registered for different individuals or businesses. An individual or business may control the signal, the range, the beacon signature, or any combination thereof. For example, an individual may host a garage sale, obtain an ad hoc beacon, and personalize a beacon signature (e.g., indicating that the loci is a garage sale).

The system of the present disclosure may utilize a geo-fence. The geo-fence may function as a range around a geographic area. The geographic area may be defined by a mailing address, a latitude and longitude, or both. The range may be about 10 meters or greater, about 15 meters or greater, about 25 meters or greater, about 50 meters or greater, about 100 meters or greater, or even about 200 meters or greater. The beacon may have a range of about 10,000 meters or less, about 5,000 meters or less or less, or even about 2,500 meters or less. The range may be adjustable. The geo-fence may be used in lieu of or in combination with a beacon. The geo-fence may be suitable for loci which are sufficiently large and/or remote in territorial scope to obviate overlap with other geo-fences or beacons. For example, a geo-fence may be appropriate for loci having a large property line such as the warehouse retailer Costco Wholesale Corporation. As another example, a geo-fence may be appropriate for loci in a remote location such as a rural area.

The system may include one or more applications. The application (i.e., "computer program") may function to execute the method of the present disclosure. The application may be stored on one or more computer storage media. The application may comprise one or more computer-executable instructions, algorithms, rules, or any combination thereof. The computer-executable instructions, when executed by a computing device may cause the computing device to perform the method described herein. The application may be downloadable onto the computing device. The application may be downloadable from an application store (i.e., "app store"). An application store may include, but is not limited to, Apple App Store, Google Play, Amazon Appstore, or any combination thereof. The application may be utilized by one or more computing devices. The application may be utilized on one or more computing devices, beacons, or any combination thereof. The application may also be referred to as a dedicated application. The dedicated application may work in conjunction with other applications. For example, the dedicated application may obtain contacts from a contact list (i.e., phonebook) application. As another example, the dedicated application may obtain photographs from a photograph application. As another example, the dedicated application may obtain location information from a map application.

The application may include one or more settings. The one or more settings may function to direct how the application interacts with one or more users and/or contacts. The one or more settings may include one or more user settings, contact settings, or both. One or more user settings may mean settings set by the user on the user's computing device. One or more contact settings may mean settings set by the contact on the contact's computing device. The one or more settings may include one or more contact designation settings, retailer preference settings, time settings, contact settings, the like, or a combination thereof. The one or more contact designation settings, retailer preference settings, time settings, and contact settings may be user settings and/or contact settings.

The settings may include contact designation settings. The contact designation settings may function to direct which of the one or more contacts may be notified when a user is in proximity to a loci (e.g., retailer). The contact designation settings may allow for a user to associate one or more contacts with one or more loci. Each locus may have the same, different, or overlapping contacts associated therewith. For example, a first loci may be associated with a first contact, a second loci may be associated with a second contact, and a third loci may be associated with both the first and second contact. The contact designation settings may allow for only the associated (e.g., designated) contacts to be notified upon the user (e.g., user mobile device) being in proximity to the loci, beacon, or both.

The settings may include retailer preference settings. The retailer preference settings may function to direct which one or more loci (e.g., retailers) trigger a notification. A user may be able to modify the retailer preference settings so that only an identified and selected locus triggers a notification.

The settings may include time settings. Time settings may function to direct the time period during which the application is active. A user may modify the time settings such that the application is always active, sometimes active, never active, or a combination thereof. A user may modify the time settings such that the application is active for a portion of a day, week, month, or the like. For example, a user may direct the application to active only during the lunch hour. As another example, a user may direct the application to be only active after the workday (e.g., between 5 pm and 10 pm). As another example, the user may direct the application to be inactive when the user is traveling away from home, such as during a business trip.

The settings may include contact settings. Contact settings may function to direct the circumstances under which a contact is notified by the application. For example, a contact may direct the application to generate notifications for when a shopper is in a proximity to particular retailers (e.g., men's clothing stores) but not other retailers (e.g., women's clothing stores). The settings may be attributed to specific persons or groups of people. For example, a first time setting may be applied to a group consisting of family members and a second time setting may be applied to a group consisting of co-workers. The settings may be attributed to particular retailers. For example, a first time setting may be applied to restaurants, directing the application to generate notifications during the lunch hour, and a second time setting may be applied to grocery stores, directing the application to generate notifications after working hours.

The system may include shopping history stored therein. The shopping history may be useful for personalizing the application to the shopping habits of the user and/or one or more contacts. The shopping history may include user shopping history, contact shopping history, or both. The shopping history may include data obtained through use of the application by one or more contacts, users, or both. The shopping history may be stored (e.g., compiled) in a database, storage medium, and/or a computing device. User shopping history may be the shopping history related to one or more users. Contact shopping history be the history associated with one or more contacts. The shopping history may include products requested by contacts, products purchased by shoppers, retailers visited, timing of visits to retailers, contacts associated with particular retailers, the like, or any combination thereof. The shopping history may be used to provide predictive recommendations. Predictive recommendations may be derived from shopping history associated with individual contacts, persons within particular groups (e.g., members of the same household), persons outside groups (e.g., entire user-base of the application), or any combination thereof. For example, a predictive recommendation to purchase product may be provided to a shopper if the product was historically, frequently purchased with a product currently on the shopping list of the user. As another example, a predictive recommendation comprising a shopping list, associated with a particular retailer, may be provided to the user when the user is in proximity to the particular retailer.

The processor may implement one or more rules. The rules may be applied to an input in order to produce an output. As a non-limiting example, the rules may be generally related to sorting data, storing data, deleting data, applying an algorithm to data, showing data, sending data, the like, or any combination thereof. The rules of the present disclosure may be related to but not limited to the notification functions of the application, the shopping list function of the application, or both. The one or more rules may include one or more notification rules, shopping list rules, the like, or a combination thereof.

The one or more rules may include one or more notification rules. The one or more notification rules may function to determine which of the one or more contacts is notified when the user is at a particular locus. The one or more notification rules may comprise (a) comparing a beacon signature, assigned to a retailer, to a beacon signal, assigned to a contact, (b) if a beacon signal of the retailer matches a beacon signal of a contact, then generate a signal to send a notification to that contact. The one or more notification rules may comprise (a) comparing a beacon signal, assigned to a retailer, to a beacon signal, assigned to a contact, at a first time (b) comparing a beacon signal, assigned to a retailer, to a beacon signal, assigned to a contact, at a second time, (c) if the difference between the second time and the first time is less than a pre-determined value, then do not generate a signal to send a notification to that contact, (d) if the difference between the second time and the first time is less than a pre-determined value, then generate a signal to send a notification to that contact. The one or more notification rules may be useful to reduce or obviate redundant notifications to a contact in a situation where a user may repeatedly pass by a retailer (e.g., walking through a mall or a downtown shopping district). The one or more notification rules may comprise (a) comparing a beacon signal, assigned to a retailer, to a beacon signal, assigned to a contact, (b) retrieving a contact setting, (c) if the contact setting specifies do-not-disturb, then do not generate a signal to send a notification to that contact.

The one or more rules may include one or more shopping list rules. The one or more shopping list rules may function to compile a shopping list for a user. The one or more shopping list rules may comprise (a) comparing an inventory selection from a first contact and a second contact, (b) if an inventory selection from the first contact and the second contact match, then remove one inventory selection from the shopping list of the user. The rules of the shopping list function may comprise (a) comparing a product in a shopping list to a user history and/or a contact history, (b) if the product is repeated two or more times in the user history and/or the contact history, then generate a signal to store the product as a frequently purchased product. The rules of the shopping list may comprise (a) comparing a product in a shopping list to a retailer history, (b) if the retailer history indicates that the product is frequently purchased with one or more other products, then generate a signal to send a notification to recommend to a user, a contact, or both one or more of the other products.

One or more computing devices may include one or more algorithms stored therein. For example, one or more algorithms may be stored within one or more storage media. The one or more algorithms may be part of or may be the one or more applications. The one or more algorithms may analyze data, relay data, receive data, initiate an operation, identify data, the like, or any combination thereof.

The one or more algorithms may include a sorting algorithm. The sorting algorithm may function to sort data according to one or more different protocols. The protocols may include arranging data alphabetically, numerically, chronologically, categorically, the like or any combination thereof. The sorting algorithm may be useful to arrange shopping lists. For example, a sorting algorithm may organize a shopping list categorically by type of product such as groceries or cleaning supplies.

The one or more algorithms may include a search algorithm. The search algorithm may function to search one or more databases based upon search criteria. The search algorithm may be useful in searching for individual products offered by retailers. For example, a contact may want to notify a user to purchase a baseball glove and before adding the baseball glove to the shopping list, the contact may search the retailer's database to determine which brands of baseball gloves are offered by the retailer.

The one or more algorithms may include a hashing algorithm. The hashing algorithm may function to map data of arbitrary size to fixed-size values. The hashing algorithm may receive data as an input and output a hash code that may be used to locate data. The hashing algorithm may be useful in storing data and data retrieval. Particularly, the hashing algorithm may be useful in the storage and/or retrieval of contacts, GPS locations, notification data (e.g., history of sent notifications), retailer inventory, messaging data (e.g., message content), user accounts (e.g., name, phone number, date of birth, and the like), user settings, contact accounts (e.g., name, phone number, date of birth, and the like), contact settings, user and/or contact shopping history, retailer accounts, retailer settings, retailer history, beacon data, the like, or any combination thereof.

The system may include or be located within one or more loci. A locus may be a point of interest. The locus may also be referred to as a retailer. The retailer may be any provider of goods and/or services. The retailer may be a business entity, individual persons (e.g., someone conducting a garage sale or selling homemade crafts), or both. The retailer may sell prepared food, food products (e.g., groceries), hardware, electronics, automotive products, household products, pet supplies, books, sports equipment, toys, clothing, wearable accessories, health and beauty products, pharmaceuticals, the like, or any combination thereof. The retailer may include grocery stores, convenience stores, department stores, specialty stores, off-price retailers, warehouse clubs, sit-down restaurants, fast-food restaurants, the like, or any combination thereof. The retailer may maintain a retailer inventory, one or more retailer computing devices, one or more retailer databases, or any combination thereof. The loci may be stationary (e.g., a brick-and-mortar store), transitory (e.g., a food truck), or both.

One or more loci may include one or more retailer computing devices. One or more retailer computing devices may function to receive and/or transmit one or more signals, communicate with one or more beacons, convert one or more signals to data entries, to send one or more data entries to a storage medium, to store one or more data entries, to retrieve one or more data entries from a storage medium, to execute one or more computer-executable instructions, to compute one or more algorithms, apply one or more rules (i.e., "protocol"), or any combination thereof. One or more retailer computing devices may be located on-site at the retailer, off-site, or a combination of both. For example, a corporate retailer may maintain a headquarters to which all of the retailers which it controls have on-site computing devices for sending data to the computing devices located off-site at the headquarters. A retailer inventory may be maintained via one or more individual retailers sending inventory data to one or more retailer databases.

The one or more retailer databases may function to receive, store, organize, transmit, or any combination thereof, data (i.e., inventory data). The one or more retailer databases may store information for the company to have an updated, real-time picture of the status of the store. The one or more retailer databases may be on-site (i.e., at the locus or headquarters) or off-site (i.e., cloud-based). The one or more retailer databases may communicate with one or more retailer computing devices via a network. The retailer database may also be accessed by third parties such as online retailers or inventory management companies.

The retailer inventory may mean the products that are currently in-store. The retailer inventory may change rapidly, especially at high-volume retailers. The retailer inventory may be updated via devices and/or applications particularly designed to keep track of inventory. For example, when shipments are received the merchandise may be scanned in and when products leave the store they may be scanned out. Scanning out of products may be done by cashiers employed by the retailer, electronic checkout device (e.g., self-checkout device, a credit card terminal, or POS device), checkout-free shopping systems (e.g., Amazon Go and Amazon Go Grocery), or any combination thereof. Use of these devices and applications for keeping track of inventory may enable the storage of real-time inventory data on a retailer database that may be accessed by the retailer, a corporate entity owning the retailer, sister companies, subsidiary companies, third-parties, or any combination thereof. Individual items of retailer inventory may include sub-beacon signal providers. Sub-beacon signal providers may function similarly to beacon providers. Sub-beacon signal providers may function to identify items within a loci rather than the loci itself. Sub-beacon signal providers may include Bluetooth®, near field communication, radio frequency identification modules, quick response (QR) codes, the like, or any combination thereof. Individual items of retailer inventory may include one or more sub-beacon signal providers. The one or more sub-beacon signal providers may communicate with a user computing device when the user computing device is within range of an item. The range may be about 30 cm or more, about 1 m or more, or even about 3 m or more. The range may be about 100 m or less, about 50 m or less, or even about 10 m or less. The range of a sub-beacon signal provider may be less than, about equal to, or greater than a range of a beacon signal provider. The individual items may be cross referenced with a shopping list, a user shopping history, user preferences, the like, or any combination thereof. After receiving a beacon signal from a sub-beacon signal provider, a recommendation and/or reminder may be sent to the user to collect the item.

Inventory data may refer to any data regarding the products identification, manufacture, location, or any combination thereof. Inventory data may include but is not limited to product name, brand, price, stock keeping unit ("SKU"), universal product code ("UPC"), manufacturing information (e.g., date manufactured and lot number), quantity, delivery schedules, time received by retailer, time purchased, product description, technical specifications, ingredients, nutrition facts, the like, or any combination thereof. Inventory data may be used for predictive recommendations. For example, technical specifications may indicate a product on a user's shopping list needs batteries to operate and so the application may generate a recommendation that batteries be added to the shopping list if batteries are not already on the shopping list. Inventory data may be used to provide real-time indications of product availability. For example, contacts may select products from a digital catalogue, which indicates to the contacts that products are or are not available in-store.

The system may include one or more application programming interfaces ("API") stored therein. One or more application programming interfaces may function to direct how one or more other computing devices, processors, storage media, databases, or a combination thereof may interact with one or more other computing devices, processors, storage media, databases, or a combination thereof. One or more other computing devices may use the API to store data, retrieve stored data, perform other operations in connection with the data, or any combination thereof. For example, an API associated with a retailer computing device may allow the application of the present disclosure to access particular data regarding the inventory of a particular retailer location, which may allow the users and/or contacts to use application of the present disclosure to compile a shopping list from a real-time listing of products located at the retailer. The API may be utilized by developers to program the application to interact with one or more retailer computing devices. The API may simplify programming by abstraction and only exposing a developer to data, programming objects, or actions the developer needs. The one or more APIs may utilize one or more architectures. The one or more architectures may be one or more web service architectures useful for requesting, receiving and/or transmitting one or more data signals, data entries, or both from one or more other remotely located computing devices, processors, storage media, databases, or a combination thereof connected via one or more networks (e.g., web-based resources). One or more web service architectures may include Representation State Transfer (REST), gRPC, the like, or any combination thereof. One exemplary API may be Amazon API Gateway™ provided by Amazon Web Services®, incorporated herein by reference in its entirety for all purposes. The one or more APIs may utilize one or more protocols for transmitting and/or receiving one or more data signals, data entries, or both. One or more protocols may include simple object access protocol (SOAP), hypertext transfer protocol (HTTP), user datagram protocol (UDP), message queuing telemetry transport (MQTT), the like, or any combination thereof.

One or more buy online, pick-up in store ("BOPIS") systems may be integrated into the application. BOPIS systems may refer to e-commerce systems in which individuals may shop online and pick up a prepared order of products at a retail location or other location. Examples of BOPIS systems include but are not limited to Meijer Pickup and Amazon Hub Locker. Shoppers may be notified by the application when the shopper is in the proximity to a retail location or other location where a prepared order is located and ready for pick-up.

The inventory data, the user history, the contact history, or any combination thereof may be utilized by the application to provide an indication of attribution (i.e., a purchase by a user of the application attributed to use of the application). One or more products may be attributed to use of the application by protocols including but not limited to: if the shopper purchases at least one product with the application then all products purchased by a user may be attributed to use of the application; if a cashier employed by the retailer and/or an electronic checkout device (e.g., self-checkout device, a credit card terminal, or POS device) indicates that the shopper used the application to purchase at least one product with the application then all products purchased by a user may be attributed to use of the application; products in a shopping list generated by the application may be cross-referenced against products that are checked out of inventory and only the matching products may be attributed to use of the application; the users and or contacts may use the application to designate which products in a shopping list generated by the application were purchased and attributed to the application; all items in a shopping list may be assumed as being purchased and attributed to the use of the application; or any combination thereof.

The application may generate a shopping list. The shopping list may refer to messages (textual or audio), sent by contacts, displayed in the application or a visually simplified listing of products derived from data sent by one or more contacts. For example, the application may sequentially display all messages from the contacts on a single, scrollable page. As another example, the application may utilize text and/or audio recognition technology to extract product requests from messages and display only the pertinent product information (e.g., product name and quantity) on a page. The application may utilize inventory data to display, for users and contacts, a product catalogue from which users and contacts can select products to add to a shopping list. The application may link to a retailer's e-commerce and/or catalogue website and generate a shopping list from selections made on the website. The application may link to third-party recipe publishing websites and selection of a recipe may generate a shopping list of the ingredients listed.

The system of the present disclosure may include one or more third-party computing devices. The system of the present disclosure may use the API of the third parties to communicate with the third-party computing devices. The third-parties may include those providing messenger services (e.g., QuickBlox provided by QuickBlox), payment services (e.g., Stripe, provided by Stripe Inc., or Splitwise, provided by Splitwise Inc.), advertising services, coupon services (e.g., Honey, provided by Honey Science LLC), recipe publishers (e.g., FoodNetwork.com, provided by Food Network Ltd.), the like, or any combination thereof. The third-party computing devices may be integrated into the system in order to simplify and/or enhance use of the application. For example, a payment service may be integrated into the application so that shopping costs are communicated to contacts in the application and the contacts can direct payment of the shopper through the application (e.g., contacts reimbursing a co-worker who picked up lunch). As another example, an advertising service may be integrated into the system in order to inform the users and/or contacts as to similar products that they may want to consider purchasing based upon the user history and/or contact history. As another example, a coupon service may be integrated into the system that automatically searches for coupons for a product when the product is added to a shopping list. As another example, a recipe publisher may be integrated into the system so that shopping lists comprising ingredients may be generated by selecting a recipe.

The system of the present disclosure may include an API that may be used by one or more third parties so the application of the present disclosure may be utilized within the one or more third-parties' applications. The system of the present disclosure may be integrated into retailer applications, navigation applications, social media applications, the like, or any combination thereof. For example, a grocery store, which maintains a shopping application for mobile phones may use the system of the present disclosure to send notifications to contacts when users are in a proximity to that particular grocery store. As another example, a navigation application (e.g., Google Maps, Waze, and the like) may use the system of the present disclosure to graphically display retailers that users and/or contacts have designated. As another example, a social media application (e.g., Facebook) may use the system of the present disclosure to send notifications to contacts who are in the user's online social network.

Method

The present disclosure relates to a method using one or more components of the system. The method may be part of an application. The method may be stored as instructions. The instructions may be computer executable instructions. The method may be stored on one or more computer storage media. The method may be executed by one or more processors. The method may include a computing device receiving a beacon signal. The computing device may include one or more mobile devices. A user mobile device may receive a beacon signal. The beacon signal may be received from a beacon. The user mobile device may be within the range of the beacon to receive the beacon signal. For example, the user mobile device may receive a beacon signal when the user mobile device is within direct proximity to the entrance of the retailer. The application may inquire the user for a mode of contact. The application may receive a first input from the user comprising the mode of contact. The application may generate a first notification, based on the mode of contact, to transmit from the user mobile device to one or more contact mobile devices based on the mode of contact and an associated protocol. The application may transmit the first notification to the one or more contact mobile devices.

The first notification may be transmitted as a text message; the text feature may be a module of the dedicated application or the text feature may utilize a separate messaging application (e.g., the dedicated application may send a request to a separate messaging application to send a text whereby the request is a data packet containing text and the desired recipient). The one or more contact mobile devices may generate a push notification upon receiving the first notification from the user mobile device.

A user mobile device may receive a beacon signal, from a beacon, when the user mobile device is within the range of the beacon. The beacon may continuously transmit a beacon signal and may communicate with the user mobile device when the user mobile device is located within the requisite range of the beacon. The application may automatically generate and transmit a first notification from the user mobile device to one or more contact mobile devices. The one or more contact mobile devices may generate a push notification upon receiving the first notification from the user mobile device. A protocol may determine which contacts are automatically notified and under which circumstances.

The associated protocol may comprise comparing the beacon signal to a contact list to identify the one or more contacts associated with a locus of the beacon; directing the user to a selectable contact list; or both. Where the associated protocol compares the beacon signal to a contact list, the user may pre-designate, in their contact list, which of the one or more contacts should be notified when the user enters the range of a particular locus (i.e., retailer). For example, the user may pre-designate a pharmacy in association with a contact who regularly requires prescription refills. As another example, the user may pre-designate a grocery store in association with a contact who is in charge of the food preparation of the household. One or more contacts may pre-designate which loci they would like to trigger a notification when the user is in the proximity of the loci. For example, a contact may pre-designate a retailer through the application and the pre-designation may be transmitted to the user's mobile device. Comparison of a beacon signal to a contact list may be performed automatically or by request of the user. For example, a user may select to automatically compare the beacon signal to a contact list for retailers who deal in goods or services that are in high and/or fluctuating demand by their contacts, such as grocery stores. Where the associated protocol involves directing the user to a selectable contact list, the user may manually select users to be notified that the user is in range of a retailer. For example, when the user is in a mall, the user may manually select their child that they are in proximity to a clothing retailer, thus indicating that the user is contemplating buying clothes for said children.

The user may be prompted to either send the first notification or not send the first notification to the one or more contact mobile devices. For example, the associated protocol may automatically compare a beacon signal to a contact list and instead of automatically sending a first notification to the one or more contacts, the application may ask the user whether or not to send a first notification to the one or more contacts. For example, the user may be birthday shopping for a child and the user may not want the application to automatically send a first notification to that child signaling that the user is birthday shopping. The first notification may be sent substantially instantaneously. This feature may be selectively turned on or off per contact or the application may automatically decline to send a notification to a contact based on the birthday data of that contact (e.g., declining to send a notification during the month before the birthday of the contact). Sending an automatic notification may relieve the user from extra interaction with their mobile device. For example, the user may be in a hurry to shop and the extra interaction of pulling out their phone, accessing their text messaging application, texting one or more people, and waiting for a reply may be burdensome. The communication between the user and the one or more contacts may be automatically facilitated so that the user is relieved of establishing and maintaining communication with one or more contacts while engaged with sensory inputs and motor functions associated with driving, shopping, note taking, or any combination thereof.

The application may prompt the one or more contacts for a second input. The second input may be an acceptance, a rejection, a text message, one or more inventory selections, or any combination thereof. For example, the application may ask the one or more contacts whether they need anything and the one or more contacts may accept (e.g., press a "yes" button) or reject (e.g., push a "no" button) the offer. As another example, the one or more contacts may input a text message requesting specific instructions of the user. As another example, the one or more contacts may access a retailer inventory and select one or more inventory selections. As another example, the one or more contacts may select one or more inventory selections from a retailer inventory and also send a text message appended to the one or more inventory selections inserting more detail into the request (e.g., explaining why the contact needs a specific inventory selection). The second input may generate a second notification, comprising text, one or more inventory selections, or both, that may be sent to the user. The second notification may be exchanged substantially instantaneously. Where the second notification is one or more inventory selections, the application may consolidate the one or more inventory selections on a shopping list viewable by the user. The application may eliminate redundant inventory selections when generating the shopping list. The first notification may be exchanged in 5 seconds or less, in 1 minute or less, in 5 minutes or less, or even in 10 minutes or less.

The application may access a retailer inventory. The retailer inventory may correspond to a retail store associated with the beacon. The retailer inventory may be updated in real-time via a retailer database. The retailer inventory may be accessed in real-time by the application via the internet.

The application may store and/or access one or more contacts via manual inputs, a database, or both. The one or more contacts may be manually inputted by the user. The user may manually input names, phone numbers, emails, addresses, pictures, ages, birthdays, or any combination thereof. The one or more contacts that are manually inputted into the application may be synced and/or shared to a contacts application. The one or more contacts may be obtained via a database stored on the storage medium of the user mobile device, which is maintained by a contacts application. For example, the application may sync and/or share information databased by the Contacts application on an iPhone.

The user may assign one or more retailers to a contact. For example, the person in charge of food preparation of a household may be assigned to one or more grocery stores. As another example, children may be assigned to an office supply store (e.g., for school supplies), a toy store, clothing stores, the like, or any combination thereof. As a result, notifications are not unnecessarily generated for contacts that may be uninterested in the particular retailer where the user is present.

The transmission of notifications between a user and contacts may be performed via a cellular network, internet, or both.

The notifications may be generated by messaging applications, the dedicated application of the present disclosure, or both. The messaging application may be a short messaging service (SMS) (i.e., information sent over a cellular network; finite size; preferably mere text), a multimedia messaging service (MMS) (i.e., information sent over a cellular network; no finite size; preferably multimedia files), over the top (OTT) (i.e., information sent via internet protocols ("IP"), or any combination thereof. The SMS, MMS, or both may include iMessage, Android Messages, the like, or any combination thereof. The OTT may include WhatsApp, WeChat, Facebook Messenger, Skype, Google Talk, the like, or any combination thereof.

Illustrative Examples

FIG. 1 illustrates an overhead view of user mobile devices 200, 200'. The user mobile devices 200, 200' are distanced from a locus 304. The locus 304 includes a beacon 300. The beacon 300 has a range 302. The range 302 may include a first range 302a and/or a second range 302b. The range 302 of the beacon 300 may be adjustable between the first range 302a and the second range 302b. The user mobile device 200 is located on a road 60. The user mobile device 200 is entering into a range 302 of the beacon 300. The user mobile device 200 is entering into the first range 302a. The user mobile device 200' is located in a parking lot 62 of the locus 304. The user mobile device 200' is located within the range 302 of the beacon 300. The user mobile device 200' is located within the second range 302b.

Figure 2:
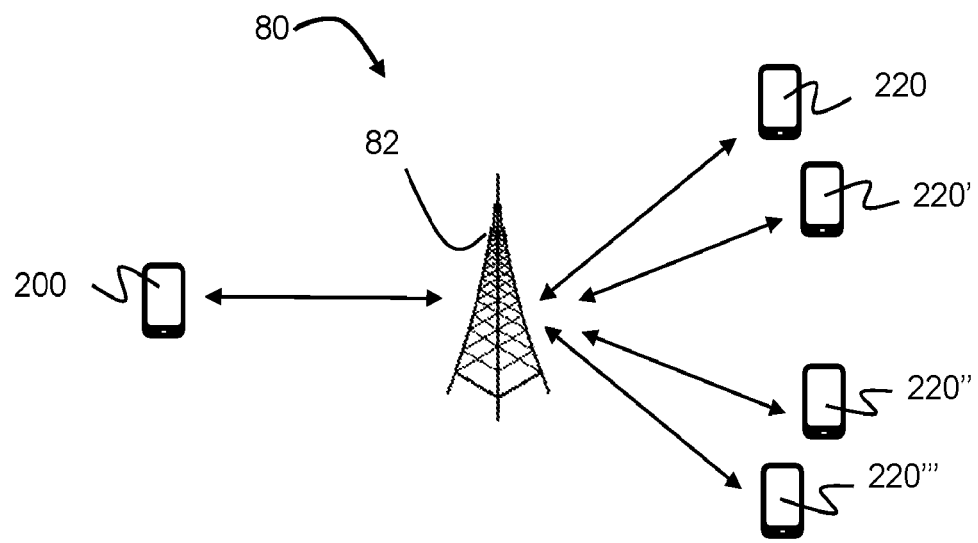
FIG. 2 illustrates a schematic view of cellular network.

FIG. 2 illustrates a schematic view of cellular network 80. The cellular network 80 includes a cell tower 82. The cell tower 82 is in communication with a user mobile device 200. The cell tower 82 is in communication with a plurality of contact mobile devices 220, 220', 220", 220'''.

Figure 3:
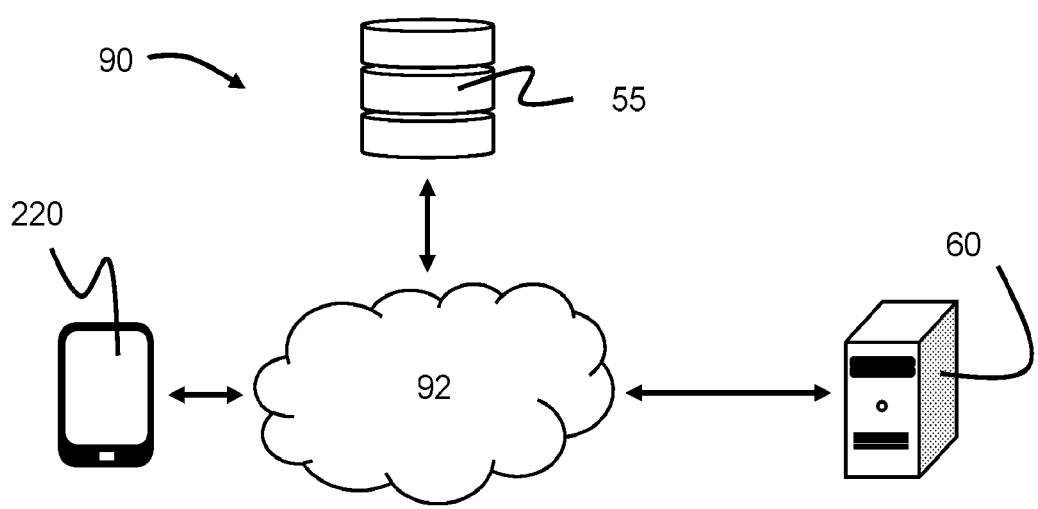
FIG. 3 illustrates a schematic view of an internet network.

FIG. 3 illustrates a schematic view of an internet network 90. The internet network 90 includes a contact mobile device 220, a retailer database 55, and a retailer computing device 60, which are interconnected via an internet 92 connection.

Figure 4:
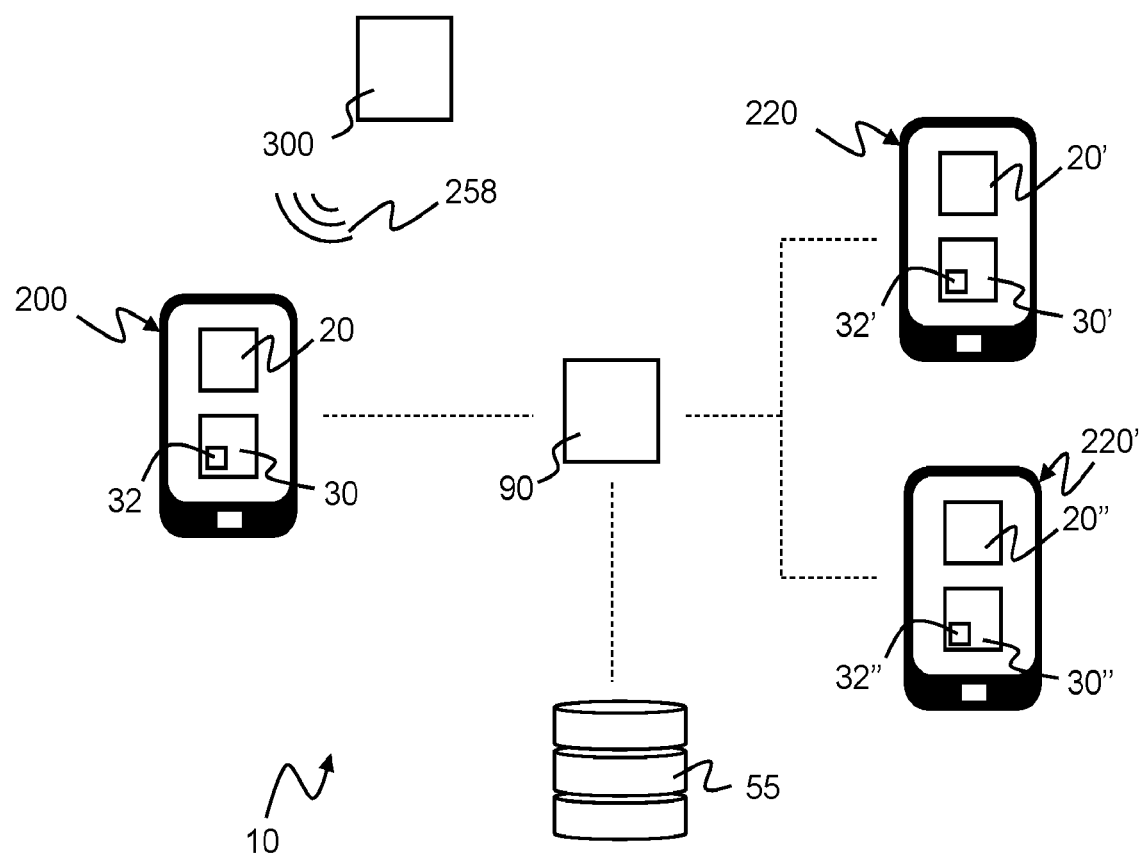
FIG. 4 illustrates a schematic view of a system of the present disclosure.

FIG. 4 illustrates a schematic view of a system 10. The system 10 includes a user mobile device 200 and contact mobile devices 220, 220' linked together via a network 90.

The user mobile device 200 and the contact mobile devices 220, 220' each include processors 20, 20', 20" and storage media 30, 30', 30". An application 32, 32', 32" is stored within each of the storage media 30, 30', 30" of the respective user mobile device 200 and contact mobile devices 220, 220'. The system 10 further includes a beacon 300, which transmits a beacon signal 258. When a user mobile device 200 enters a range 302 (not shown), such as shown in FIG. 1, the user mobile device 200 receives the beacon signal 258. The user mobile device 200 can transmit a text message 462 (not shown), such as shown in FIG. 6E, via the network 90. The user mobile device 200 and the contact mobile devices 220, 220' can communicate, via the network 90, with a database 50, such as a retailer database 55.

Figure 5:
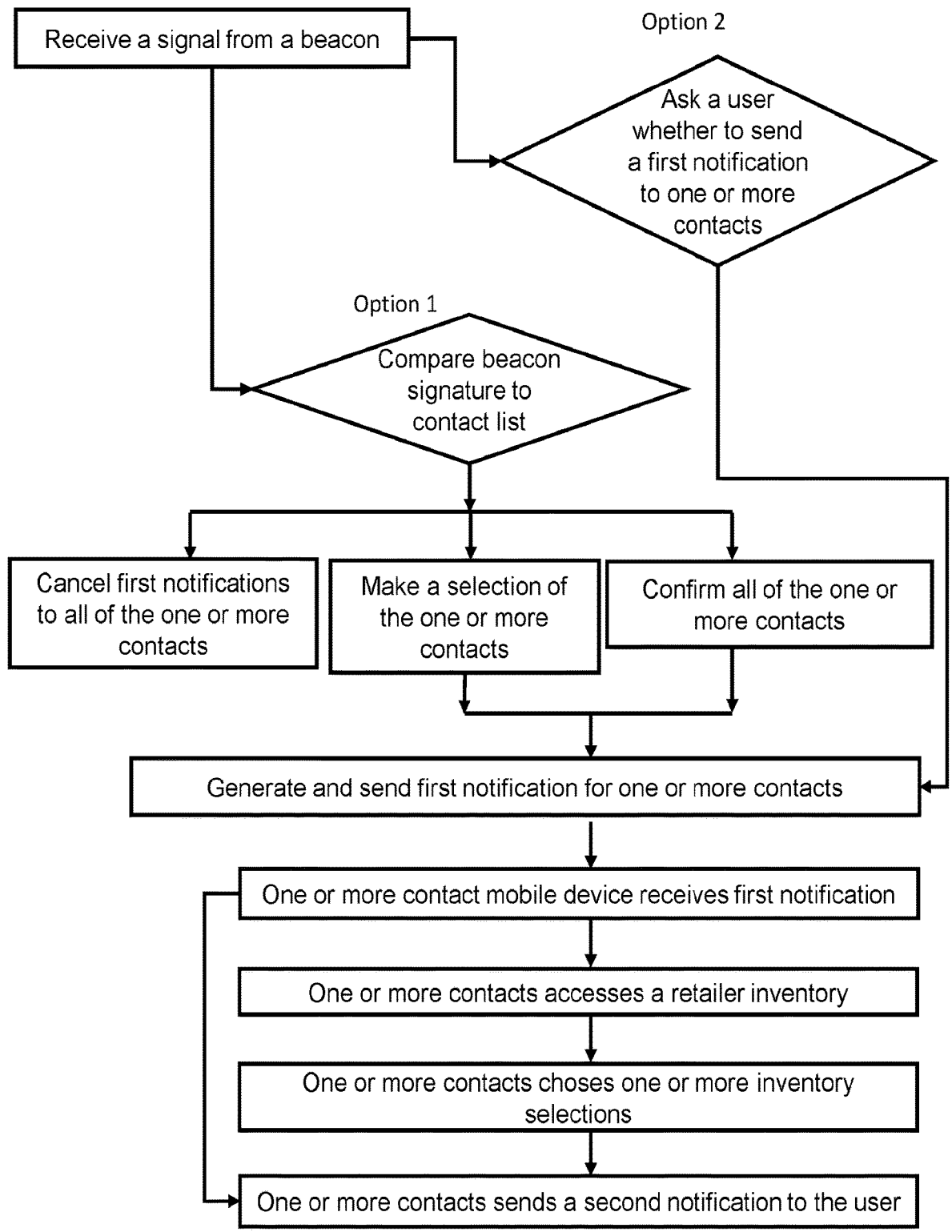
FIG. 5 illustrates a flowchart of a method of the present disclosure.

FIG. 5 illustrates a flowchart of a method of the present disclosure. The flowchart illustrates the method starting from the instant the mobile device receives a signal from a beacon and ends where a notification is sent back to the user from the contact. The method begins with a user mobile device 200 (not shown) receiving a signal from a beacon 300 (not shown). The method may provide an active method (Option 2) or passive method (Option 1). The passive method commences comparing the beacon signal to a contact list. If no contacts are associated with the beacon, then the application cancels first notifications to all of the one or more contacts. Optionally, the user may select one or more contacts to send a notification to. Alternatively, the application may be set to send a notification to one or more contacts upon the user confirming that the notification be sent. The application may generate and send a first notification for one or more contacts. Upon receiving the first notification, the one or more contacts access a retailer inventory in order to choose one or more inventory selections to the user. The inventory selections are sent as a second notification to the user.

Figure 6A:
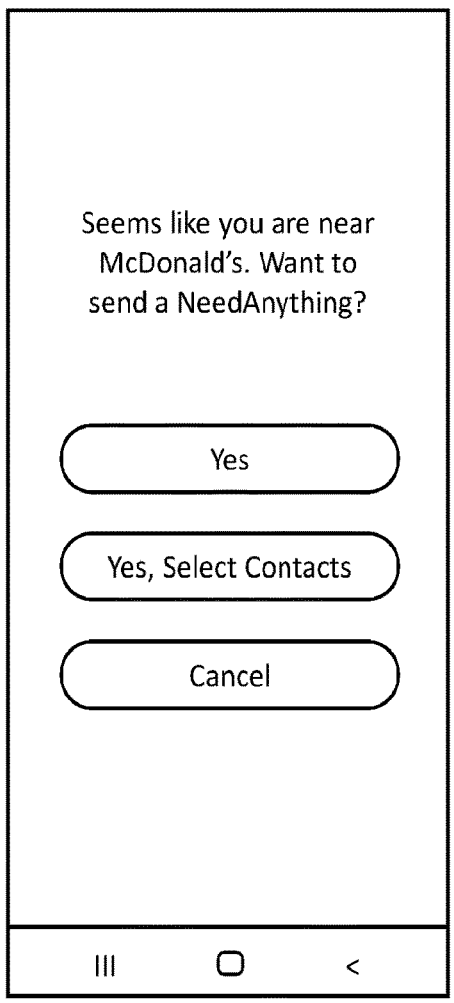
FIG. 6A illustrates a view of a user GUI.

FIG. 6A illustrates a view of a user GUI 202. The GUI 202 is the interface of a user mobile device 200 (not shown). The GUI 202 includes an alert screen 223. The GUI 202 displays information and options shown and available to a user when the user mobile device 200 (not shown) receives a signal from a beacon 300 (not shown).

Figure 6B:
FIG. 6B illustrates a view of a user GUI.

FIG. 6B illustrates a view of a user GUI 202. The GUI 202 displays a main menu 222 when a user, contact, or both first open the application.

Figure 6C:
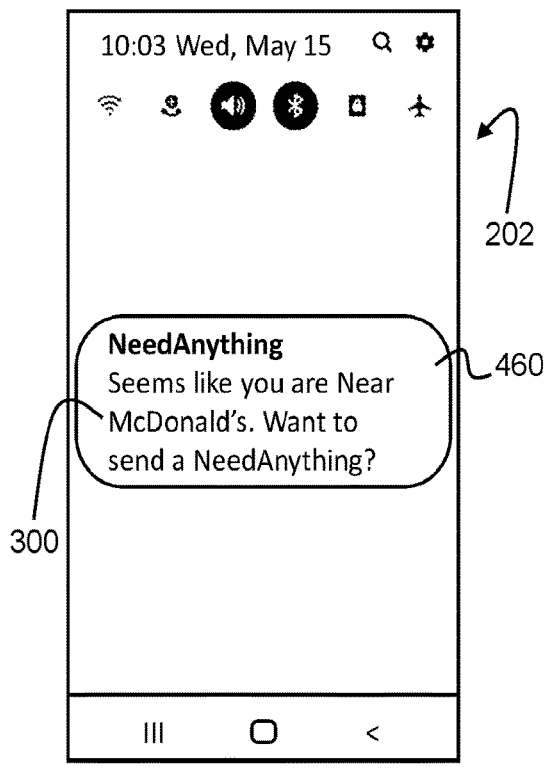
FIG. 6C illustrates a view of a user GUI.

FIG. 6C illustrates a view of a user GUI 202. The GUI 202 displays a push notification 460 to notify the user that a locus 300 is nearby. The push notification 460 may occur when the user mobile device 200 (not shown) is within a range 302 (not shown) of a beacon 300 (not shown), such as shown in FIG. 1.

Figure 6D:
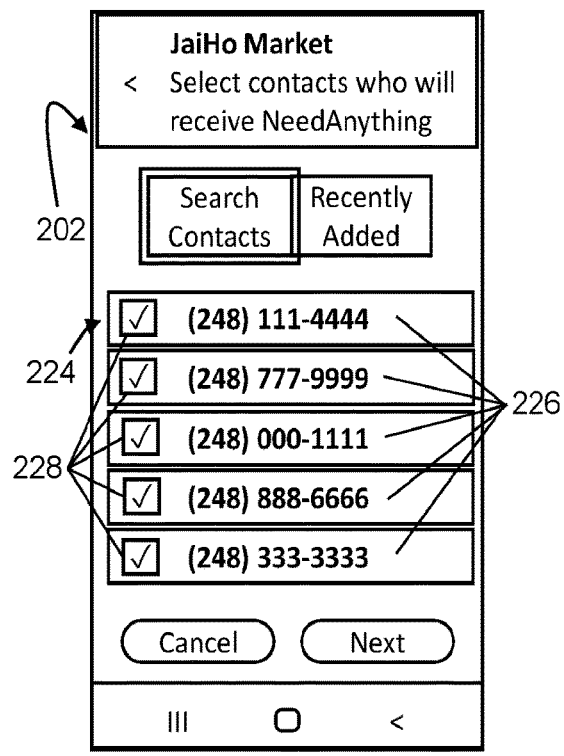
FIG. 6D illustrates a view of a user GUI.
Figure 6E:
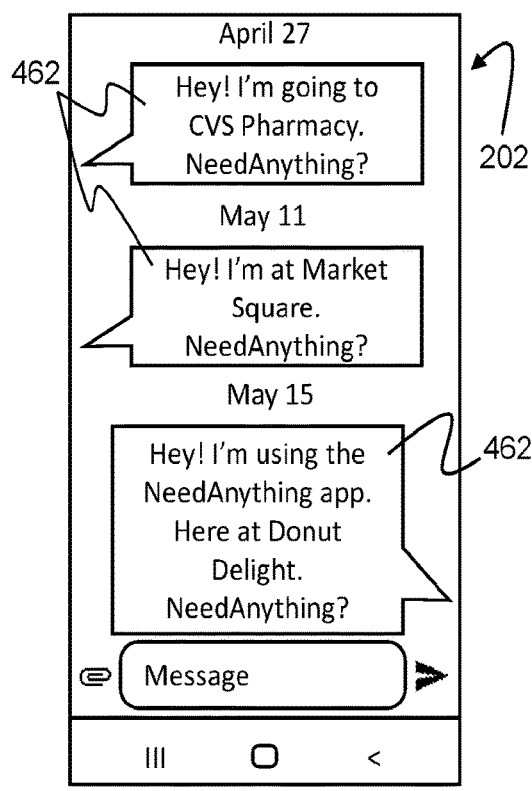
FIG. 6E illustrates a view of a user GUI.

FIG. 6D illustrates a view of a user GUI 202. The GUI 202 displays a selectable contact list 224. The contact list 224 may be useful with an active method (such as Option 2 in FIG. 5). The contact list 224 includes one or more contacts 226. Checkboxes 228 appear next to the contacts 226. The checkboxes 228, which are checked, denote that the user has selected the corresponding contacts 226 to be sent a notification (such as the text message 462 in FIG. 6E).

FIG. 6E illustrates a view of a user GUI 222. The GUI 222 displays a text message 462. The text message 462 may be associated with the generate and send step as illustrated in FIG. 5.

FIG. 7 illustrates a flowchart of a method of the present disclosure. The flowchart illustrates the method of adding a locus to a locus list of the user, contacts, or both and the method of assigning a locus to one or more contacts. The user accesses a locus list and thereafter navigates a locus list.

The user optionally adds a locus, if the locus is not already saved in the locus list, or selects a locus, if the locus is already saved in the locus list. Upon addition and/or selection of a locus, the user assigns one or more contacts to the locus.

FIG. 8A illustrates a view of a user GUI 202. The GUI 202 displays a menu of loci 304. An icon 230 indicates whether there are and how many of contacts are assigned to the locus. The GUI 202 corresponds to the method shown in FIG. 7.

FIG. 8B illustrates a view of a user GUI 202. The GUI 202 displays a customization menu 232. The customization menu 232 may be accessed after selecting a locus 304, such as shown in the GUI 202 of FIG. 8A. In this menu 232, the user may see what contacts 226 are already assigned to the locus 304. In this menu 232, the user may choose to assign other contacts 226 to that locus 304.

Figure 8C:
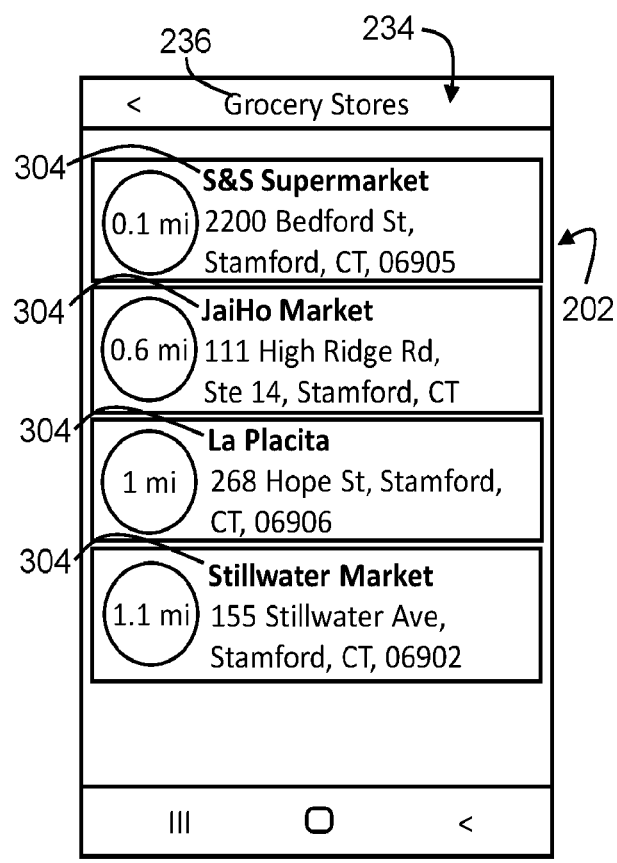
FIG. 8C illustrates a view of a user GUI.

FIG. 8C illustrates a view of a user GUI 202. The GUI 202 displays a loci search menu 234. The loci search menu 234 may be associated with the flowchart as shown in FIG. 6. The user may search for loci 304 via a keyword search or a category search 236 ("grocery store" category, as shown).

Figure 8D:
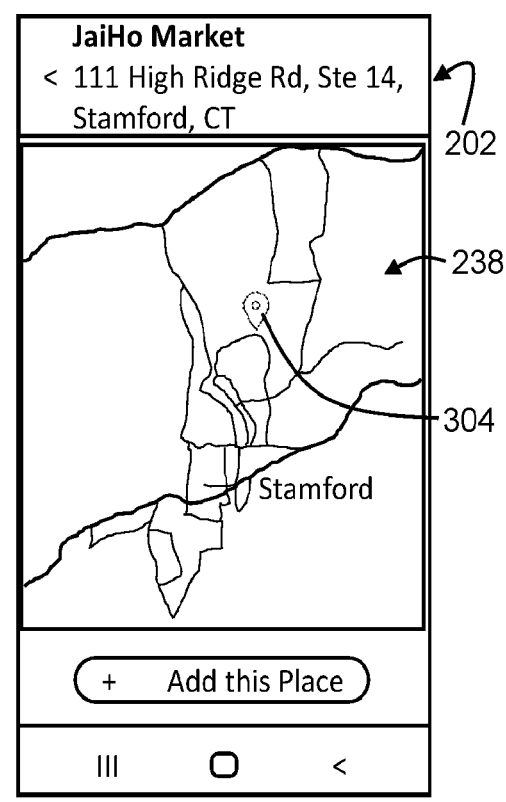
FIG. 8D illustrates a view of a user GUI.

FIG. 8D illustrates a view of a user GUI. The GUI 202 may display a screen associated with the flowchart shown in FIG. 7. The user may search for loci 304 by navigating the loci search menu 234 (as shown in FIG. 8C). A locus 304 may be selected and thereafter displayed on a map 238. The map 238 may be useful for the user to determine whether the loci 304 is of the desired location. Upon confirmation, the loci 304 may be added to the saved loci menu 240 (not shown).

Figure 9:
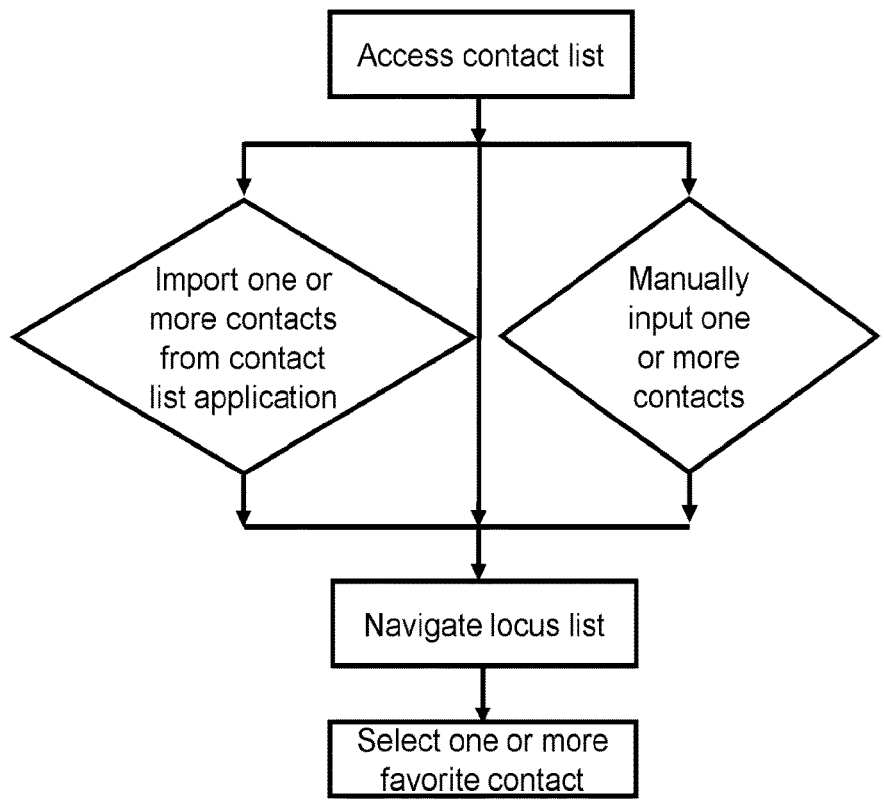
FIG. 9 illustrates a flowchart of a method of the present disclosure.

FIG. 9 illustrates a flowchart of a method of the present disclosure. The flowchart illustrates the method of creating, importing, and managing contacts. The user accesses the contact list stored on the user's computing device. The user may optionally import one or more contacts from a contact list application on the user's computing device or the user may manually input one or more contacts. The user may navigate a locus list. During navigation of the locus list, the user may select one or more of the contacts to associate with one or more loci (i.e., "favorite contact").

Figure 10:
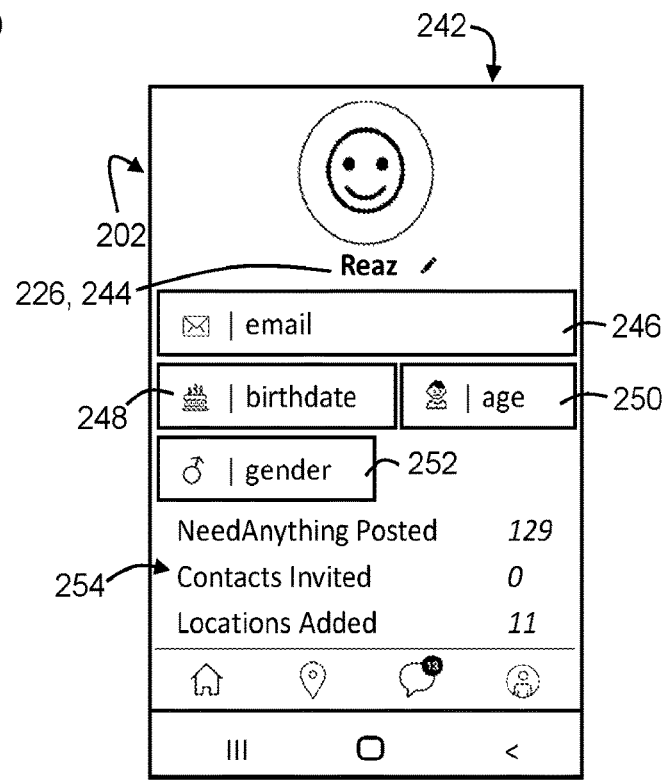
FIG. 10 illustrates a view of a user GUI.

FIG. 10 illustrates a screenshot of a user GUI 202. The GUI 202 displays a contact information menu 242. The contact information menu 242 may allow for manually inputting contact information, such as illustrated in flowchart in FIG. 9 or editing contact information. Contact information may include information related to each contact 226. Contact information may include a contact name 244, email 246, birthday 248, age 250, and/or gender 252. The contact information menu 242 may also include user history 254 associated with the contact 226.

Figure 11:
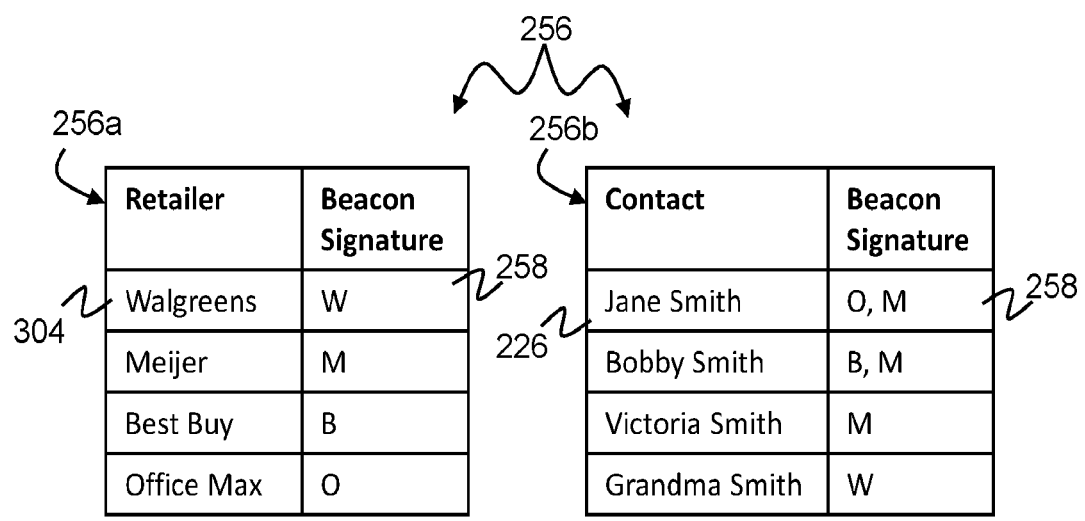
FIG. 11 illustrates a database table.

FIG. 11 illustrates a database tables 256, such as implemented in Option 1 in FIG. 5. The database tables 256 include a locus table 256a and a contact table 256b. The locus table 256a correlates a plurality of loci 304 with corresponding beacon signals 258. The contact table 256b correlates a plurality of contacts 226 with corresponding beacon signals 258. The rules of the present disclosure may determine if a retailer and a contact have corresponding beacon signals. If so, a notification may be automatically sent to a contact or the application can suggest to a user to send a notification to the contact.

Examples

The application of the present disclosure may provide for a user to automatically notify one or more contacts that the user is passing by a retailer or service provider. For example, the user may be driving on a road and may enter the range (i.e., the proximity) of the beacon signal, the range being one mile from the retailer. The application may thereafter notify the user, the contacts, or both, that the user is within the range of the retailer. The contacts may select for the user to stop at the retailer, the user may select to notify the contacts that the user is nearby the retailer or both. Where the application notifies the contacts that the user is nearby a retailer, the notification may be automatic. Where the user selects to notify the contacts, the user may manually select the contacts to be notified.

The application of the present disclosure may provide for the user to automatically notify one or more contacts that the user is entering the premises of a retailer or service provider. For example, the user may be stopping into a retailer on the way home from work and upon entering the parking lot of the retailer, the user may enter the range (i.e., the proximity) of the beacon signal, the range being a radius around the retailer that may encompass the parking lot of the retailer. The application may thereafter notify the user, the contacts, or both, that the user is within the range of the retailer. The contacts may select for the user to stop at the retailer, the user may select to notify the contacts that the user is nearby the retailer or both. Where the application notifies the contacts that the user is nearby a retailer, the notification may be automatic. Where the user selects to notify the contacts, the user may manually select the contacts to be notified.

The application of the present disclosure may provide for a contact of a user to request a product or service from the user. For example, the contact of the user may send a notification to the user that they need a product from a particular retailer; the application may then notify the user when the user as soon as the request is sent or when the user is in a range of the retailer.

The application of the present disclosure may provide for a contact of a user to send a shopping list to the user via accessing a retailer inventory and performing one or more inventory selections. For example, the application may display a retailer inventory of the retailer where the user is present or within a range of. The application may display, for the one or more contacts of the user, a real-time inventory of the retailer and the one or more contacts may select products from the retailer inventory (i.e., inventory selections) that are needed. As a result of this feature, the one or more users may avoid making a selection of the product that the retailer does not have in stock and thereby prevent wasted time of the user in searching for the desired product.

Any numerical values recited in the above application include all values from the lower value to the upper value in increments of one unit provided that there is a separation of at least 2 units between any lower value and any higher value. These are only examples of what is specifically intended and all possible combinations of numerical values between the lowest value and the highest value enumerated are to be considered to be expressly stated in this application in a similar manner. Unless otherwise stated, all ranges include both endpoints and all numbers between the endpoints.

The terms "generally" or "substantially" to describe angular measurements may mean about +/−10° or less, about +/−5° or less, or even about +/−1° or less. The terms "generally" or "substantially" to describe angular measurements may mean about +/−0.01° or greater, about +/−0.1° or greater, or even about +/−0.5° or greater. The terms "generally" or "substantially" to describe linear measurements, percentages, or ratios may mean about +/−10% or less, about +/−5% or less, or even about +/−1% or less. The terms "generally" or "substantially" to describe linear measurements, percentages, or ratios may mean about +/−0.01% or greater, about +/−0.1% or greater, or even about +/−0.5% or greater.

The term "consisting essentially of" to describe a combination shall include the elements, ingredients, components, or steps identified, and such other elements ingredients, components or steps that do not materially affect the basic and novel characteristics of the combination. The use of the terms "comprising" or "including" to describe combinations of elements, ingredients, components, or steps herein also contemplates embodiments that consist essentially of the elements, ingredients, components, or steps.

Plural elements, ingredients, components, or steps can be provided by a single integrated element, ingredient, component, or step. Alternatively, a single integrated element, ingredient, component, or step might be divided into separate plural elements, ingredients, components, or steps. The disclosure of "a" or "one" to describe an element, ingredient, component, or step is not intended to foreclose additional elements, ingredients, components, or steps.

Reference Number Listing

10—System; 20—Processor; 30—Storage Media; 32—Application; 50—Database; 55—Retailer Database; 60—Retailer Computing Device; 80—Cell Network; 82—Cell Tower; 90—Internet Network; 92—Internet; 202—Graphic User Interface (GUI); 223—Alert Screen; 222—Main Menu; 224—Contact List; 226—Contacts; 228—Checkboxes; 230—Icon; 232—Customization Menu; 234—Loci Search Menu; 236—Category Search; 238—Map; 240—Saved Loci Menu; 242—Contact Information Menu; 244—Contact Name; 246—Email; 248—Birthday; 250—Age; 252—Gender; 254—User History; 256—Database Tables; 256a—Locus Table; 256b—Contact Table; 258—Beacon signal; 304—Locus; 300—Beacon; 302—Range; 460—Push Notifications; 462—Text Message; Option 1—Passive Method; Option 2—Active Method

What is claimed is:

1. One or more non-transitory computer storage media storing computer-executable instructions that, when executed by a computing device having a processor, cause the computing device to perform a method that provides concise and facilitated communication between a user and one or more contacts, the method comprising:
   (a) assigning a beacon signal provider with a beacon signature identifying a retailer;
   (b) assigning the one or more contacts to the beacon signature identifying the retailer in a database table;
   (c) receiving a beacon signal, from the beacon signal provider, located on a premises of the retailer, when a user mobile device is within a range of the beacon signal provider;
   (d) automatically generating, without interaction of the user, a first notification, at least informing the one or more contacts of a location of the user mobile device, to transmit from the user mobile device to one or more contact mobile devices, which are remote from the range of the beacon signal provider, based on an associated protocol; wherein the associated protocol comprises automatically comparing, without interaction of the user, the beacon signature of the beacon signal received by the user mobile device to a contact list to identify the one or more contacts assigned to a matching beacon signature;
   automatically and substantially instantaneously transmitting, without interaction of the user, the first notification to the one or more contact mobile devices assigned to the matching beacon signature; and
   (f) receiving a shopping list from the one or more contact mobile devices, wherein the shopping list includes one or more goods, services, or both associated with the retailer.

2. The one or more non-transitory computer storage media of claim 1, wherein before the step of generating the first notification, the method comprises:
   inquiring the user for a mode of contact, and
   receiving, from the user, a first input comprising the mode of contact.

3. The one or more non-transitory computer storage media of claim 2, wherein the mode of contact includes manually selecting the one or more contacts in the contact list.

4. The one or more non-transitory computer storage media of claim 1, wherein the method includes a step, performed after the step (e), of prompting the one or more contact mobile devices for a second input.

5. The one or more non-transitory computer storage media of claim 4, wherein the second input comprises one or more inventory selections; and
   wherein the one or more inventory selections include the one or more goods chosen from a retailer inventory, the retailer inventory corresponding to the retailer with the beacon signal provider.

6. The one or more non-transitory computer storage media of claim 5, wherein the second input generates a second notification comprising the one or more inventory selections.

7. The one or more non-transitory computer storage media of claim 6, wherein the one or more inventory selections received from the one or more contacts are consolidated on the shopping list.

8. The one or more non-transitory computer storage media of claim 7, wherein the one or more inventory selections that are redundant are filtered out of the shopping list.

9. The one or more non-transitory computer storage media of claim 1, wherein the retailer is identified by a name, a category of goods and/or services provided by the retailer, a location of the retailer, a status of the retailer, or any combination thereof.

10. The one or more non-transitory computer storage media of claim 1, wherein the one or more contacts are obtained via manual inputs, a database, or both.

11. The one or more non-transitory computer storage media of claim 1, wherein transmission of the first notification, a second notification, or both, is performed via a cellular network, internet, or both.

12. The one or more non-transitory computer storage media of claim 6, wherein the first notification, the second notification, or both, are generated via a dedicated application.

13. The one or more non-transitory computer storage media of claim 6, wherein the first notification, the second notification, or both, are generated via a messaging application; and
   wherein the messaging application is a short messaging service (SMS), a multimedia messaging service (MMS), over the top (OTT), or any combination thereof.

14. The one or more non-transitory computer storage media of claim 1, wherein the method includes a step, performed after the step (d), of providing the user a prompt to either send the first notification or not send the first notification to the one or more contact mobile devices.

15. The one or more non-transitory computer storage media of claim 1, wherein the method includes a step, performed before the step (c), of accessing the contact list from a contact list application, importing the one or more contacts from the contact list to a dedicated application, or both.

16. The one or more non-transitory computer storage media of claim 1, wherein the associated protocol is performed at a first time and then repeated at a second time prior to step (e), and if a difference between the second time and the first time is less than a pre-determined value, then the method is terminated.

* * * * *